United States Patent [19]

Lubbers et al.

[11] 4,007,843
[45] Feb. 15, 1977

[54] MULTI-AISLE WAREHOUSE SYSTEM WITH MOBILE LIFT HAVING CONTROL MEANS FOR AN ARTICLE TRANSFER VEHICLE

[75] Inventors: LeRoy Lubbers; William K. Stubbs, both of Grand Rapids; Howard A. Zollinger, Ada Township, Kent County, all of Mich.

[73] Assignee: Rapistan, Incorporated, Grand Rapids, Mich.

[22] Filed: Nov. 8, 1974

[21] Appl. No.: 521,950

Related U.S. Application Data

[62] Division of Ser. No. 272,287, July 17, 1972, Pat. No. 3,880,299.

[52] U.S. Cl. .............................. 214/16.4 B; 104/48
[51] Int. Cl.² ............................................. B65G 1/06
[58] Field of Search ....... 214/16 B, 16.4 A, 16.4 B, 214/16.1 EA, 16.4 C; 104/48

[56] References Cited

UNITED STATES PATENTS

| 1,927,677 | 9/1933 | Bennington | 214/16.4 B |
| 3,285,437 | 11/1966 | Lemelson | 214/16.4 A |
| 3,387,723 | 6/1968 | Lemelson | 214/16.4 A |
| 3,417,879 | 12/1968 | Gough | 214/16 B |
| 3,428,195 | 2/1969 | Pamey | 214/16.4 A |
| 3,503,530 | 3/1970 | Burch et al. | 214/16.4 B |
| 3,519,156 | 7/1970 | Keenan et al. | 214/16.4 B |
| 3,557,973 | 1/1971 | Louviers | 214/16 B |

FOREIGN PATENTS OR APPLICATIONS

| 262,893 | 9/1967 | Austria | 214/16.4 B |
| 1,931,792 | 9/1970 | Germany | 214/16.4 B |
| 1,938,473 | 4/1971 | Germany | 214/16.4 A |

*Primary Examiner*—L. J. Paperner
*Assistant Examiner*—R. B. Johnson
*Attorney, Agent, or Firm*—Price, Heneveld, Huizenga & Cooper

[57] ABSTRACT

A warehouse storage system comprises an array of storage bins arranged in vertical tiers with the tiers arranged in rows and having aisles between the rows. A mobile vertical lift moves across the ends of the aisles and carries thereon a mobile transfer vehicle which can be elevated by the mobile vertical lift to any desired storage level. The self-powered mobile transfer vehicle is adapted to be automatically dispatched from the mobile vertical lift at a predetermined aisle and level and is programmable to travel via tracks along the aisle to a predetermined bin location, and extend retrieving mechanism from the vehicle for transferring the pallet load between the mobile transfer vehicle and the storage bin.

12 Claims, 27 Drawing Figures

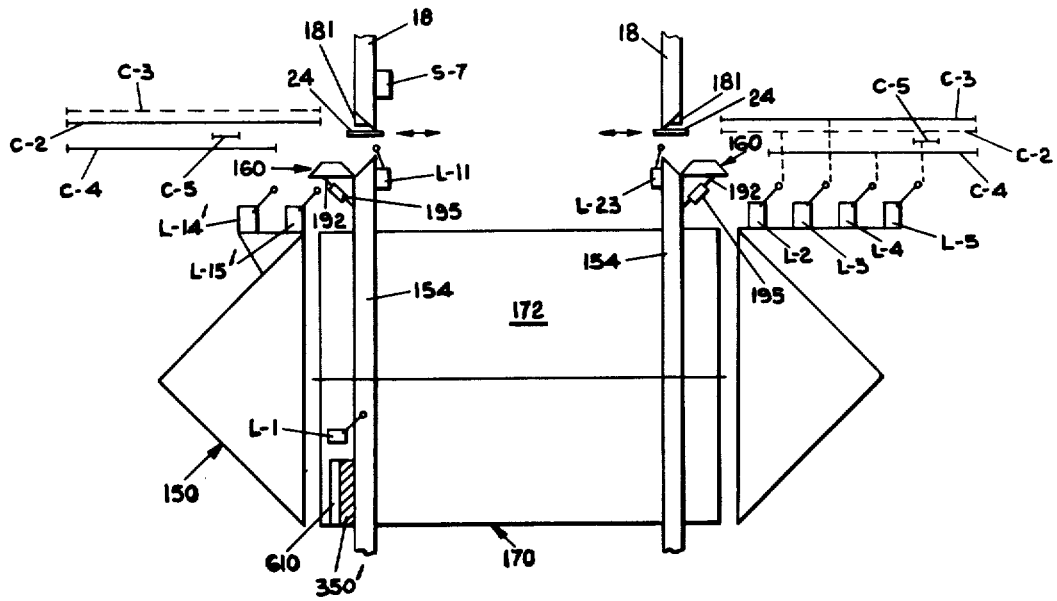
FIG.11
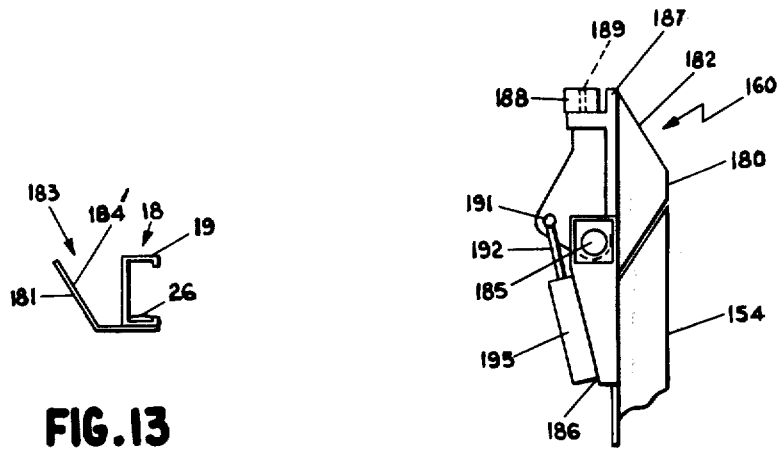
FIG.13
FIG.12 ics, in commerce, it has become necessary to increase the through-put capacity of warehousing systems so as to efficiently store and retrieve such articles at these facilities which provide retail and other outlets with a variety of different items. In recent years, the use of semi-automated equipment in place of manual transferring equipment has been incorporated with limited success in an attempt to increase the efficiency of warehousing systems. More recently, stacker cranes have been developed which travel down aisles of multi-tiered storage bins. These cranes are guided by an operator who locates the stacker crane across from a desired storage location and then either manually picks from that storage location or can extend lifting forks or the like into the storage bin to store or retrieve articles therefrom. In the more sophisticated systems, the operator is replaced by some type of electronically operated control system.

MULTI-AISLE WAREHOUSE SYSTEM WITH MOBILE LIFT HAVING CONTROL MEANS FOR AN ARTICLE TRANSFER VEHICLE

CROSS REFERENCE TO RELATED APPLICATION

This is a division of application Ser. No. 272,287, filed July 17, 1972 now U.S. Pat. No. 3,880,299.

BACKGROUND OF THE INVENTION

The present invention relates to a warehouse system and particularly to apparatus for automatically transferring articles to and from the system.

With the ever-increasing demands for moving articles, in commerce, it has become necessary to increase the through-put capacity of warehousing systems so as to efficiently store and retrieve such articles at these facilities which provide retail and other outlets with a variety of different items. In recent years, the use of semi-automated equipment in place of manual transferring equipment has been incorporated with limited success in an attempt to increase the efficiency of warehousing systems. More recently, stacker cranes have been developed which travel down aisles of multi-tiered storage bins. These cranes are guided by an operator who locates the stacker crane across from a desired storage location and then either manually picks from that storage location or can extend lifting forks or the like into the storage bin to store or retrieve articles therefrom. In the more sophisticated systems, the operator is replaced by some type of electronically operated control system.

Even more recently, a system has been developed that is described in U.S. Pat. No. 3,503,530, Arthur R. Burch, et al., issued Mar. 31, 1970 and which employs a first vehicle which travels across the aisles of the storage rack on tracks and carries with it a second vehicle which can be dispatched down the aisles. The second vehicle includes a mobile vertical elevator for aligning a picking unit with a storage bin. The picking unit then can retrieve or discharge articles between the storage bin and the second vehicle. The first vehicle includes a load station for transferring the articles between the second vehicle and first vehicles.

Although such a system represents an improvement in efficiency over manual picking systems, this system as well as the semi-automatic stacker crane systems lacks the through-put capacity since the vehicle which travels in the aisle is adapted to move vertically as well as along the aisle and therefore, only one vehicle can be employed for each aisle end. Thus, the maximum numbers of vehicles that actually store and retrieve articles into and out of the system is limited to two for each multi-level aisle assuming that each end of the aisle has a first vehicle that can transfer an associated second vehicle from aisle to aisle. In many warehouses only one aisle end is available thereby limiting vehicles which accomplish the transfer of articles to and from the storage bin to one per aisle.

The use of a stacker crane or other systems which have the ability to travel the length of one aisle and elevate within the aisle to any of the storage bin heights requires that a single unit have enough through-put capacity to handle the through-put required for each aisle. Because of the input and output systems usually associated at one end of the system, it is not feasible to operate two such stacker cranes in one aisle. This provides, in some cases, a significant limitation to the through-put capacity of the system which is best suited for extremely long aisles of storage. If long aisles are employed, however, the throughput is limited by the efficiency of the operation of the stacker crane. On the other hand, if the storage location is laid out to include many short aisles to overcome this limitation, a plurality of the relatively expensive stacker cranes or their equivalent are necessary to obtain the desired throughput. The expense of the system rises significantly, since each vehicle is relatively complex to provide along-the-aisle movement as well as vertical movement in addition to the picking motion required to reach into a storage bin. Thus, these systems have undesirable limitations either as to efficiency in their ability to provide the desired through-put or as to their expense if employed with shorter aisles to provide the desired through-put capacity.

Another important limitation upon existing systems of this type is the fact they require the entire aisle to be unobstructed vertically. This is considered a serious fire hazard and places a limit on the height to which articles may be stored. This invention eliminates this problem because no or only limited vertical movement of the articles is performed in the aisles.

SUMMARY OF THE INVENTION

The system of the present invention, however, provides a mobile vertical lift that travels across the ends of the aisles in a storage location and carries a mobile transfer car that can be discharged to any level of a given aisle by the mobile vertical lift. In this system, the cross-aisle vehicle is vertically movable and can discharge one transfer car at one level of the aisle and second, third, or more transfer vehicles at different levels of the same or other aisles. In this system, therefore, the number of transfer cars which are used to transfer articles into and out of the storage bins and which can be dispatched along a single aisle is greatly increased. By employing several transfer vehicles with a single mobile vertical lift, the efficiency of the warehousing system in its ability to rapidly store and retrieve articles therefrom is greatly increased. Also, since the mobile transfer vehicles move only in a horizontal plane, they are less complex and, therefore, less costly than vehicles which travel both horizontally and vertically within the aisles.

It is an object, therefore, of the present invention to provide an improved automatic warehousing system which employs a mobile vertical lift that travels across the ends of the aisles in a storage area and is adapted to carry and discharge a second vehicle movable at a single aisle level along an aisle and which includes means for receiving and discharging articles from and to a storage bin.

It is another object of the present invention to provide an automatic warehousing system that employs a single mobile vertical lift and a plurality of mobile transfer vehicles which are adapted to move along an aisle receiving and discharging goods from and to storage bins therein while the mobile transfer vehicle is transporting different mobile transfer vehicles to other locations within the system.

It is an additional object of the present invention to provide a self-powered mobile transfer vehicle that can be discharged into a storage aisle and transfers goods from and to storage bins and which can leave the system thereby providing an interface between the storage area and other facilities.

It is an additional object of the present invention to provide a home station which serves as an interface between the storage system and input and output conveyors such that mobile transfer vehicles can be discharged and received by the mobile vertical lift at the home station for receiving goods into the system and discharging goods from the system thereby.

It is an additional object of the present invention to provide a transfer car storage area where the mobile transfer vehicles can be located when not in use and are readily available to the mobile vertical lift when needed.

It is still an additional object of the present invention to provide a retractable bridge between input and output stations at the home station such that mobile transfer vehicles can be transported between the input and the output stations when the mobile vertical lift is not at the home station.

Another object of the present invention is to provide programming means to automatically control the positions of either the mobile vertical lift or mobile transfer vehicle, or both.

A further object of the present invention is to provide locating means on the mobile vertical lift to accurately align the lift with an aisle and locating means on each mobile transfer vehicle to accurately align it with a storage bin.

These and other objects of the present invention will become apparent upon examining the drawings together with the accompaning description thereof.

BRIEF DESCRIPTION OF THE DRAWINGS

FIG. 11 is a plan view in schematic form of the mobile vertical lift;

FIG. 12 is a detailed plan view of the aligning means employed with the mobile vertical lift;

FIG. 13 is a detailed front elevational view in cross section showing a portion of the horizontal channel members employed in conjunction with the aligning means shown in FIG. 12;

DETAILED DESCRIPTION OF THE PREFERRED EMBODIMENT

Figure 1:
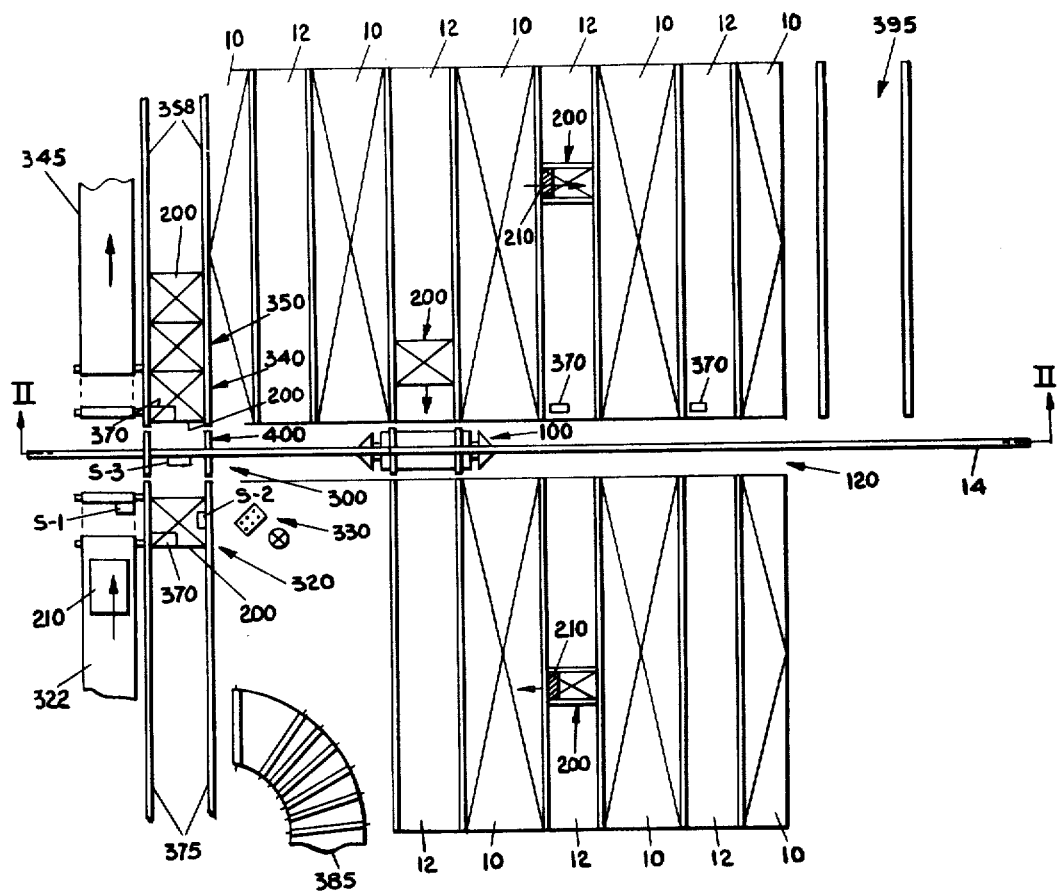
FIG. 1 is a plan view in schematic form showing a warehousing system embodying the materials handling apparatus of the present invention.
Figure 2:
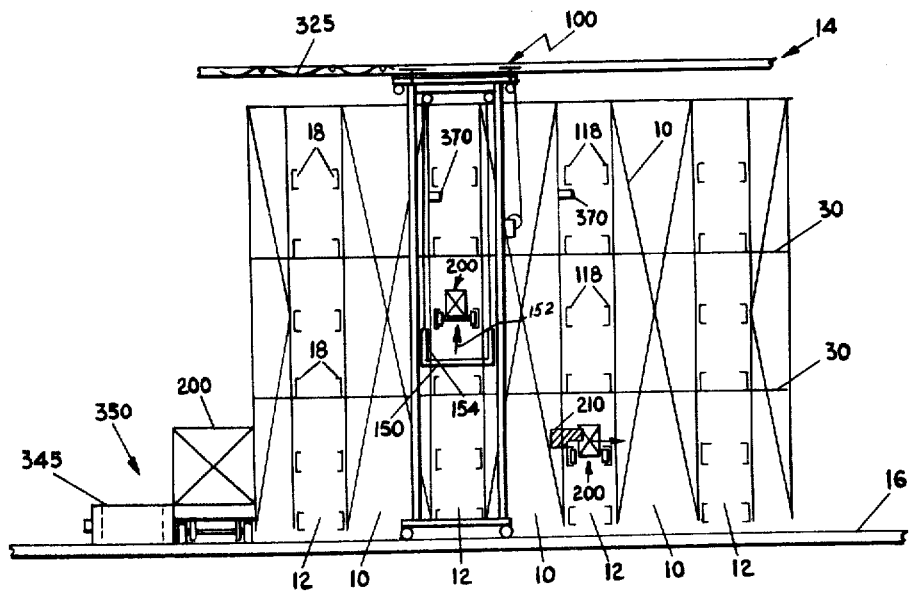
FIG. 2 is a side elevational view in schematic form of the warehousing system shown in FIG. 1.

Referring now in detail to FIGS. 1 and 2, there is shown a warehousing system comprising a plurality of storage racks 10 separated by aisles 12 therebetween which extend along the length of the storage racks 10. The racks are divided into a plurality of levels and individual storage bins which form an array of storage locations adapted to receive palletized loads therein. A transverse aisle 120 extends along one end of the aisles 12 between the two sections of storage racks, and a mobile vertical lift 100 adapted to engage monorails 14 and 16 traverses aisle 120. The mobile vertical lift (trans-aisle vehicle) 100 is adapted to receive any one of a plurality of mobile transfer vehicles 200 which are dispatched into the aisles 12 of the storage system so that materials can be transferred into and out of the storage bins by the transfer vehicles 200.

The mobile vertical lift 100 operates between a home station generally indicated at 300 which includes input and output stations 320 and 340, respectively, which serves as an interface between the warehousing system and other systems such as a receiving station or shipping station, respectively. The warehousing system further includes a transfer vehicle storage magazine 350 communicant with the output station 340 and adapted to store transfer vehicles when not in use. A retractable bridge 400 facilitates the movement of transfer vehicles 200 between the output station 340 across the monorail 16 and the input station 320 area when when the mobile vertical lift 100 is not at the home station. The mobile vertical lift 100 includes a vertically movable lift platform 150 thereon which has a carriage assembly which carries the mobile transfer vehicles 200 by means of guide rails 154 adapted to receive guide wheels on the mobile transfer vehicles 200. The lift platform 150 is shown in FIG. 2 moving upwardly as indicated by the arrows 152 to an aisle level where a transfer vehicle 200 is in position to be received by the mobile vertical lift 100. When the mobile vertical lift is in position, the guide rails 154 are aligned with horizontal guide rails 18 extending along the aisles 12 of the storage racks 10 such that the transfer vehicle 200 can transfer between the mobile vertical lift 100 and aisles 12. The transfer vehicles 200 are self-powered and are guided within the storage racks 10 along the aisles 12 by means of the guide rails 18 at a predetermined vertical height such that palletized loads 210 can be automatically transferred between storage locations within the storage racks and the mobile transfer vehicles 200 by transfer means carried on the vehicles 200. In FIGS. 1 and 2, arrows accompanying the palletized loads 210 and the transfer vehicles 200 indicate the direction of movement of the loads into and out of storage and the transfer vehicle motion toward the mobile vertical lift 100.

The mobile vertical lift 100 can be directly coupled to a control station 330 (FIG. 1) by means of a festoon cable 325 as shown in FIG. 2 to receive positional information from a computer to control the movement of the vertical lift 100 and direct the movement of the transfer vehicles 200. The cable 325 also provides the mobile vertical lift 100 with operating power for its drive motors. The mobile vertical lift can also be controlled semi-automatically by employing a punched card or like system in which an operator inserts such a card into a reader on the lift to control its movement within the system. Likewise, it is possible to manually control the positioning of the lift by carrying an operator thereon and providing suitable operator controls.

Each mobile transfer vehicle 200 includes its own drive mechanism and power supply such that it is self-powered in its motion within the aisles 12. The input-/output station rails (375 and 358) include an electrical supply bus or collector bar and each mobile transfer vehicle includes a contact shoe adapted to slidably engage the collector bar such that when the transfer vehicle is at the home station area, it can be externally powered to conserve the electrical energy stored in its batteries. It is noted that such a conventional power supply can be employed at various of the warehouse areas including the access aisles if desired, although in the preferred embodiment, the transfer vehicles are self-powered when in the aisles. It is seen that by employing a system such as that shown in FIGS. 1 and 2 whereby the mobile transfer vehicles 200 are movable in a horizontal plane and are elevated and lowered by means of a mobile vertical lift at an end of the aisles, the storage racks can be horizontally divided at predetermined vertical intervals by, for example, fire barriers 30 (FIG. 2) which extend horizontally through the storage rack area but not through the transverse aisle 120 in which the mobile vertical lift 100 travels. Thus, when the racks extend, for example, to 100 feet or more in height, they can be divided at several vertical intervals by horizontal fire barriers to lessen fire hazards. It is seen that only the ends of the aisles, and not the storage rack, must be open for the use of the materials handling equipment of this invention. These open ends can be equipped with fire doors to close them off in case of emergency.

FIGS. 1 and 2 illustrate the use of the materials handling system to interface with the input and output stations 320 and 340. The input station 320 has a conveyor 322 for transferring materials from a receiving station, for example, in a warehousing facility to the input station where materials are picked up by a mobile transfer vehicle 200 at the input station 320 on guide rails 375. The output station 340 has a conveyor 345 associated therewith which receives materials from a transfer vehicle 200 at the output station on rails 358 also associated with and extending into the vehicle storage magazine 350. Conveyor 345 then transfers materials to a shipping dock, for example, that is associated with the warehousing system. In addition, the facility shown in FIGS. 1 and 2 may include additional input and output means such as the guide rails 375 which are adapted to guide transfer vehicles 200 to a different facility such as an assembly line within the system. A shunting or stub conveyor 385 may be located adjacent the rails 375 to receive preselected loads from some of the transfer vehicles 200 and carry them to a different area, such as a packaging station. Also, another set of guide rails 395 may be provided at an opposite end of the storage racks for guiding vehicles 200 to a repair facility, maintenance facility, or any other of a number of different facilities. Thus, it is seen, by employing a self-powered transfer vehicle 200, the vehicle itself may under its own power and programmed intelligence move between the warehouse facilities shown in FIGS. 1 and 2 to other facilities by means of rails 375 and 395 or may transfer loads thereon to various facilities as indicated by the associated conveyors 322, 345 and 385. Any number of other variations are possible with such a system that employs a self-powered transfer vehicle which includes means thereon for transferring unitized loads between the vehicle and other means, such as conveyors. The transfer vehicles are, as explained in detail below, programmable to move under their own power to any preselected location within the storage area, or to one of the interface facilities, Having briefly described the overall system structure and operation, details of the preferred embodiment of the present invention are presented.

Figure 3:
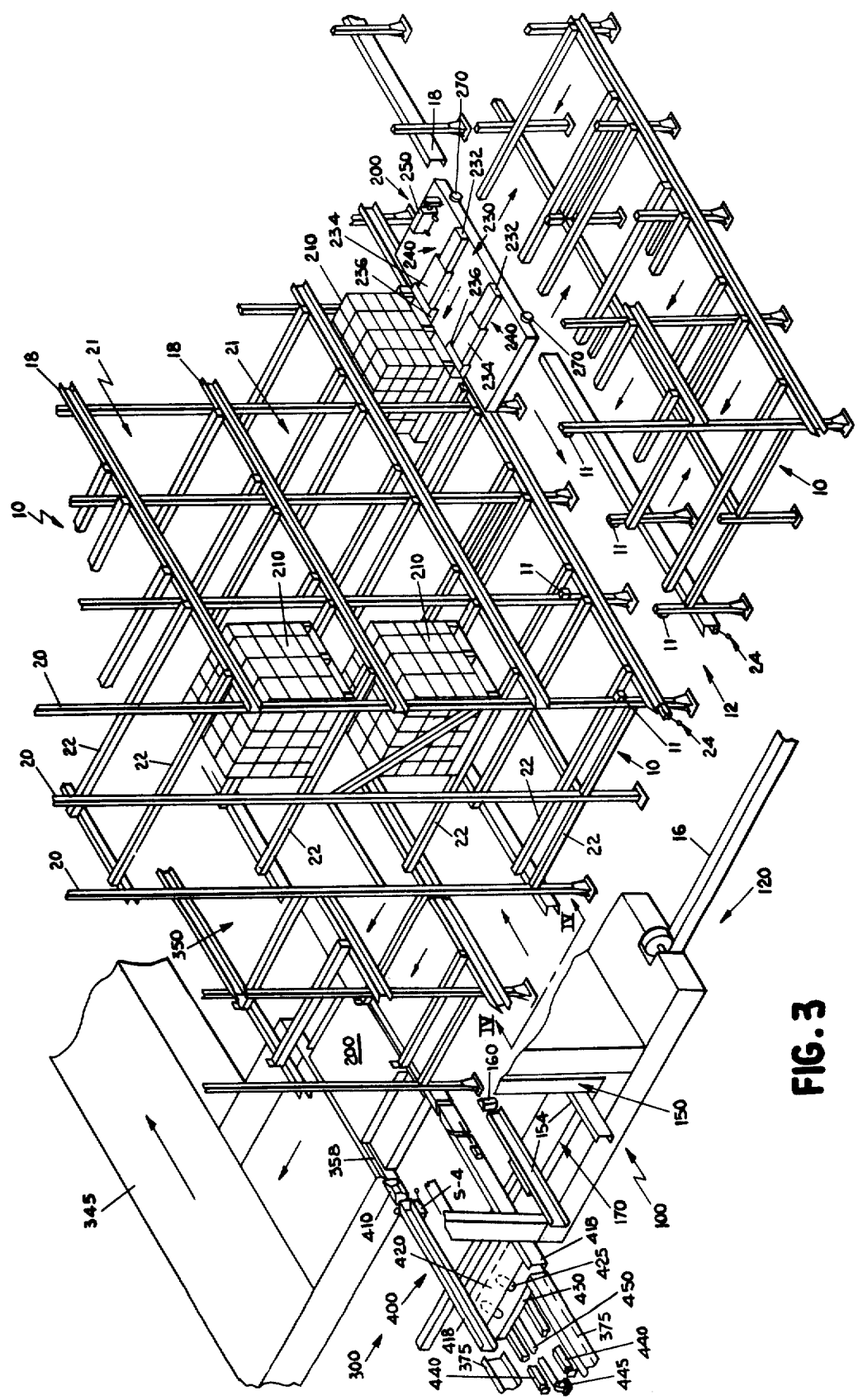
FIG. 3 is a fragmentary perspective view of the warehousing system showing the detailed structural elements forming the storage racks, the guide rails, the transfer vehicles used in the materials handling system as well as the home station and retractable bridge employed therewith.

Referring now to FIG. 3, there is shown a perspective view of a portion of the warehousing system shown in FIGS. 1 and 2, showing a cutaway portion of a mobile vertical lift 100 and a mobile transfer vehicle 200 within an aisle 12 between storage racks 10.

The storage racks 10 comprise vertical supports 20 and load supports 22 that define individual storage bins 21 forming an array along each aisle. The bins 21 are adapted to receive standard palletized loads 210 therein as shown. The warehousing system is divided into dual sections of arrays of bins 21 that are accessible from adjacent aisles 12. The guide rails 18 form a portion of the horizontal support members for the storage racks 10 as well as providing support for the transfer cars 200. As seen in the figure, the carriage assembly 170 on the mobile vertical lift 100 also includes guide rails 154 which are adapted to be aligned with the rails 18 such that a transfer vehicle 200 can be transferred from the storage rack 10 onto the lifting platform 150 of the mobile transfer vehicle 100 on which the carriage assembly rests.

Each transfer vehicle 200 includes a drive motor 250 coupled to guide wheels 270 which ride within the guide rails 18. Additionally, each transfer vehicle includes means 230 (FIG. 3) for transferring palletized loads 210 between a storage bin 21 and the vehicle 200 or between the conveyors 322, 345 and 385 and the vehicle. In the preferred embodiment, means 230 comprise a pair of forks 240 each comprising a three-sectional platform having a vertically movable base 232, a middle section 234 movable to either side of the vehicle 200, and a top section 236 extensible to either side in relation to the middle section 234 and which fits under a palletized load 210 for lifting and transferring the load to and from the vehicle 200.

The home station area 300 where the mobile transfer vehicles 200 are transferred to and from the mobile vertical lift 100, includes a retractable bridge 400 as shown in FIG. 3. The bridge comprises a pair of guide rails 418 mounted above the monorail 16 on which the mobile vertical lift travels and which are lowerable and retractable under the guide rails 375 shown in FIGS. 1 and 3. When the mobile vertical lift 100 enters the home station area 300, the tracks 418 are retracted out of the way so as not to obstruct the movement of the mobile vertical lift. This is accomplished by mounting the guide rails 418 of the bridge 400 on a platform 420 which is mounted to an additional platform 430 by means of a pair of actuation cylinders 425. This arrangement allows the platform 420 to be elevated and lowered in relation to the platform 430. Platform 430 is at approximately ground level and is mounted by means of guide wheels within a pair of tracks 440 such that it is longitudinally movable in a direction parallel to the tracks 375 and perpendicular to the monorail 16.

A motor 445 with a drive belt 450 coupled to the platform 430 can be actuated to cause the platform 430 and, therefore, the platform 425 and rails 418 thereon to be drawn to the left in FIG. 3 out of the way of the mobile vertical lift 100, once the rails 418 have been lowered by means of the cylinders 425. The bridge 400 is positioned when the mobile vertical lift 100 is not at the home station to provide a transfer path for the mobile transfer vehicles 200 from the output station 340 into the input station 320. The bridge 400 allows the transfer vehicle 200 to receive a palletized load 210 from the input station 320 or to move along the tracks 375 to transfer loads to the stub conveyor 385 or otherwise operate between the input and output stations 320 and 340, respectively, without requiring the presence of the mobile vertical lift 100. By so designing the system, the transfer cars 200 can be utilized to their maximum efficiency as can the mobile vertical lift 100.

Both the guide rails 418 of the bridge 400 and the guide rails 154 of the carriage assembly 170 associated with the mobile vertical lift 100 having locating means 410 and 160, respectively, which are employed in conjunction with tapered ends of the guide rails 18 in the storage racks 10 to accurately align the guide rails 154, 418 with the storage rack guide rails 18 such that the transfer vehicles 200 can easily be transferred to and out of the storage rack aisles 12. Details of the locating mechanism are shown and described with reference to FIGS. 11 through 13 and discussed below. The guide rails 18 each include stops 24 (only two shown in FIG. 3) at the ends of the rails 18 adjacent the aisle 120 to prevent the transfer cars 200 from accidentally slipping from the aisle level when the mobile vertical lift 100 is not in position to receive the transfer vehicle 200. The construction details of the guide rails 18 and stops 24 associated therewith are shown in FIG. 4.

Figure 4A:
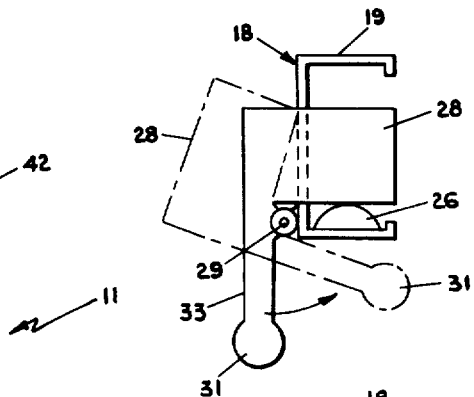
FIGS. 4A and 4B are a detailed enlarged view of the stop elements of the warehousing system shown in FIG. 3.
Figure 4B:
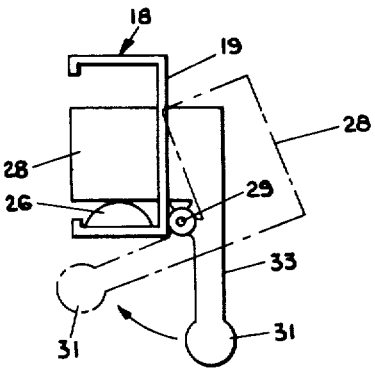

As seen in FIG. 4, the guide rails 18 comprise a longitudinal channel member 19 having a generally C-shaped cross section. A slightly crowned rail 26 is mounted along the interior bottom surface of the channel member 19 as shown. Rail 26 carries the weight of the transfer vehicle 200 thereon by means of the tapered guide wheels 270 on the transfer vehicle which contacts rails 26.

Each of the stops 24 located at the end of each guide rail 18 comprises a plate 28 having a cross-sectional area sufficiently large to close off the open area of the guide rail 18. The plate 28 is pivotally coupled to the C-shaped channel 19 by means of a pivot pin 29. The stops 24 are weighted by means of a weight 31 attached to the plate 28 by means of an arm 33 such that they will normally be held in the position shown in solid lines. In this position, the plate 28 closes off the end of the channel 19 when the mobile vertical lift 100 is not positioned such that its guide rails 154 are aligned with the guide rails 18 of the storage racks 10.

The aligning means 160 on the mobile vertical lift, however, are adapted to swing inwardly when the lift 100 aligns with an aisle and include members which contact the stops such that the left and right stops 28 are pivoted in a direction indicated by the arrows to the position shown in phantom lines in FIG. 4. In this position, the plates 28 will be out of the way and allow the transfer vehicle 200 to freely move between the guide rails 18 in the storage racks and the guide rails 154 on the mobile vertical lift 100. The stops associated with the guide rails 358 in the vehicle storage magazine 350 operate in a similar manner to allow the transfer vehicles 200 to cross the bridge rails or tracks 418 and enter the storage magazine 350 when the locating means 410 have positioned the tracks in alignment with the guide rails 358 of the vehicle storage area. The construction of the interface between the mobile vertical lift guide rails 154 and the guide rails 18 within the storage racks 10 will be discussed in conjunction with the detailed description of the mobile vertical lift 100 which follows.

Figure 5:
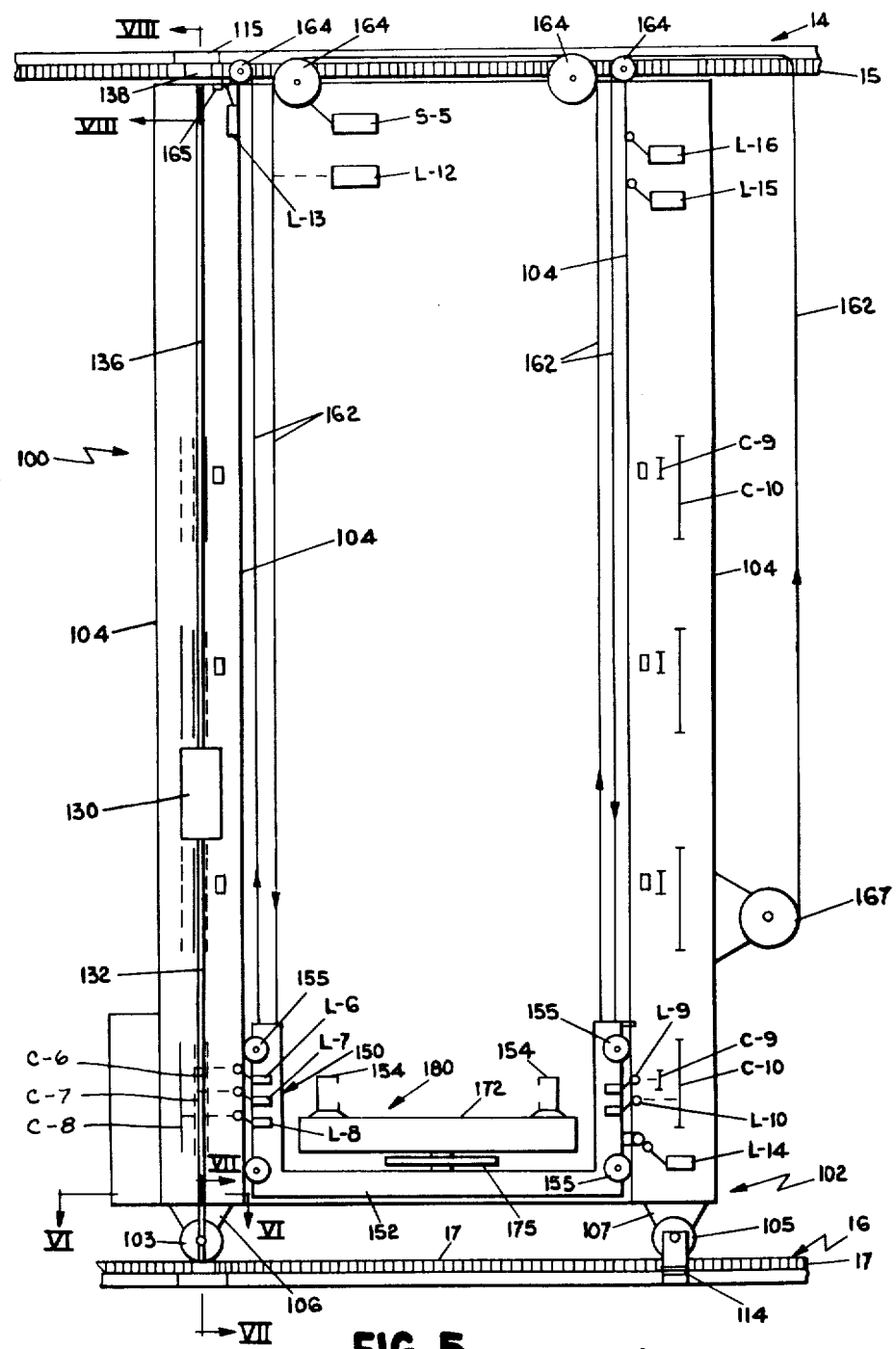
FIG. 5 is a side elevational view of the mobile vertical lift shown in schematic form.
Figure 6:
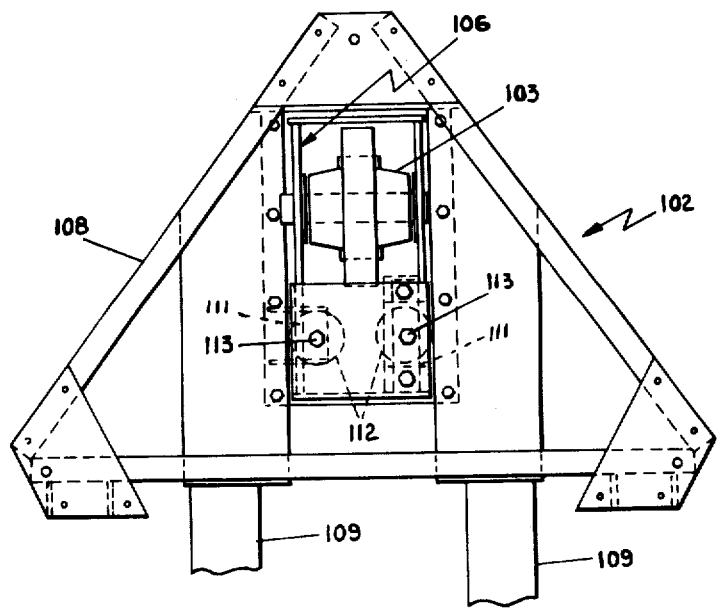
FIG. 6 is a detailed sectional view of a portion of the mobile vertical lift taken along section lines VI—VI of FIG. 5 showing one of the load carrying wheels and associated guide wheels.
Figure 9:
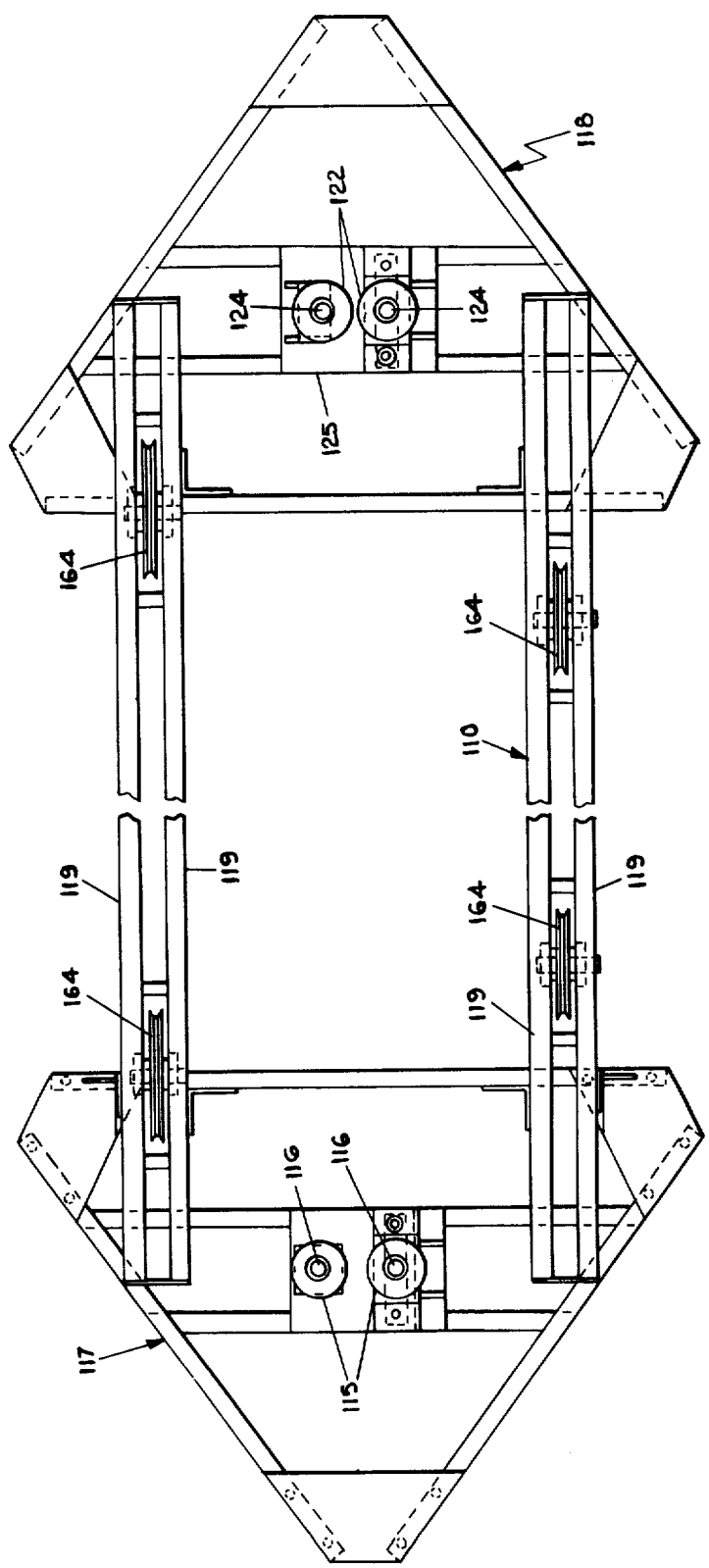
FIG. 9 is a detailed plan view of the top structure of the mobile vertical lift.

Referring now in detail to FIGS. 5–13, there is shown a mobile vertical lift 100 comprising a base member 102 to which is attached vertical support members 104 that extend upwardly from the base member 102 to an upper structure 110 shown in detail in FIG. 9. The mobile vertical lift 100 rests on the lower monorail 16 by means of a pair of load support wheels 103 and 105 coupled to the base 102 by means of brackets 106 and 107, respectively. The front portion of the base member 102 is shown in detail in FIG. 6 which illustrates the member 102 as comprising a triangular frame 108 to which is attached the mounting bracket 106 that holds the front support wheel 103. A pair of support beams 109 extend rearwardly and are coupled to a similar shaped rear triangular frame member (not shown in detail) to complete the frame of the base member 102. Rotatably mounted within the frame 108, by means of axles 113 and brackets 111, is a pair of guide wheels 112 (FIG. 6). These guide wheels straddle the lower monorail 16 as shown in detail in the cross-sectional view of FIG. 7. The rear support wheel 105 also includes a pair of guide wheels and mounting bracket assembly similar to that in the front as shown schematically in FIG. 5 and indicated generally at 114.

The mobile vertical lift 100 is coupled to the upper monorail 14 by means of a front pair of guide wheels 115 rotatably mounted to the upper assembly 110 by means of a pair of axles 116 coupled within a frame 117 forming the front portion of the upper structure 110 as shown in FIG. 9. It is seen in FIG. 9 that the forward frame section 117 is generally triangular shaped as is the rear frame member 118 coupled to the front frame member by means of four strut members 119. A pair of guide wheels 122 are rotatably coupled within the rear frame 118 by means of axles 124 coupled to the frame 118 by means of a bracket 125.

Figure 10:
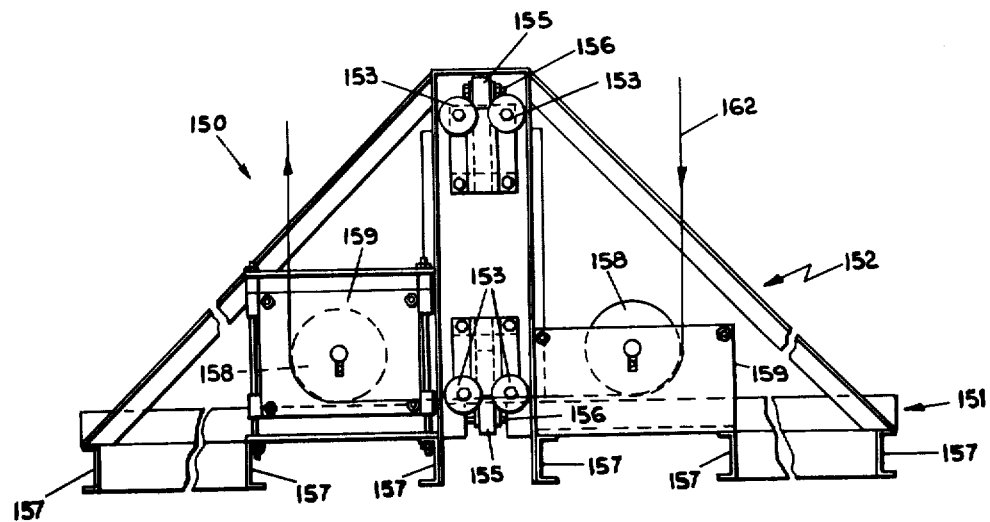
FIG. 10 is a detailed side elevational view of the lifting platform assembly which fits within the mobile vertical lift and is vertically movable therein.

The lifting platform 150 on the mobile vertical lift 100 is shown in detail in FIG. 10 and comprises a frame assembly 151 having triangular shaped end segments 152 joined by struts 157. The lift platform 150 is vertically movable within the mobile vertical lift 100 by means of a plurality of wheels 155 rotatably mounted to the end segments 152 by means of axles 156. Guide wheels 153 are mounted to the ends 152 of platform 150 as shown in FIG. 10. These wheels straddle the vertical support members 104 of the mobile vertical lift 100 to insure the smooth operation of the raising and lowering of platforms 150 within the mobile vertical lift 100. The platform 150 also includes a pair of pulleys 158 rotatably mounted to brackets 159 on each end 152 of platform 150 through which a lifting cable 162 (FIG. 5) is strung such that the platform 150 can be raised and lowered within the vertical support members 104 of the mobile vertical lift 100.

The lifting cable 162 is also strung through four pulleys 164 mounted between the struts 119 of the upper assembly 110 (FIGS. 5 and 9) and is anchored at one end to the structure 110 by anchoring means 165 shown in FIG. 5. The opposite end of cable 162 is attached to a hoisting reel and motor unit 167 which is selectively actuated as explained below to wind or unwind the lifting cable 162 thereon such that the lifting platform 150 is raised and lowered.

Figure 7:
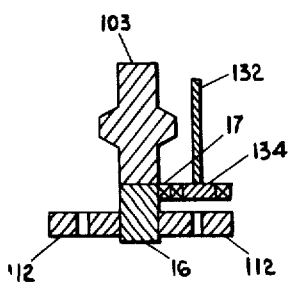
FIG. 7 is a detailed front elevational view in cross section taken along the section lines VII—VII of FIG. 5 showing the lower drive mechanism for the mobile vertical lift and its relationship to the tracks.
Figure 8:
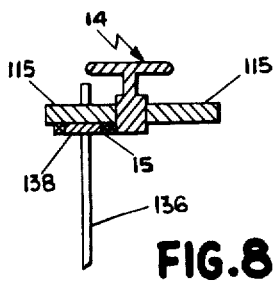
FIG. 8 is a detailed front elevational view in cross section taken along the section lines VIII—VIII of FIG. 5 of the top drive mechanism associated with the mobile vertical lift.

The mobile vertical lift is driven by means of a drive motor 130 having a lower axle 132 coupled to a drive gear 134 which engages a rack 17 mounted on the side of the lower monorail 16 (FIGS. 5 and 7). The motor 130 further includes an upper shaft 136 which is coupled to a drive gear 138 (FIGS. 5 and 8) that engages a rack 15 mounted on one side of the upper monorail 14. Shafts 132 and 136 are rotated by the actuation of motor 130 in the same direction such that the teeth on the drive gears 134 and 138 which engage the teeth on the racks 17 and 15, respectively, causing the mobile vertical lift 100 to travel along the monorails 14 and 16.

A carriage assembly 170 is mounted on the lifting platform 150 and comprises a base member 172 which is attached to the base 152 of the platform 150 by means of a pivot assembly 175 which permits the carriage 170 to pivot a sufficient amount such that the aligning means 160 (FIGS. 3, 11 and 12) associated with the guide rails 154 mounted on the carriage assembly 170 can align the carriage assembly rails with the guide rails 18 within the storage racks 10 (FIG. 3). In some installations, the carriage can be mounted to the lifting platform with rollers which permit lateral motion therebetween for aligning the tracks. The operation of the alignment means 160 in conjunction with the guide rails 154 on the carriage assembly 170 is best understood by referring to FIGS. 11-13.

In FIG. 11, a portion of the mobile vertical lift 100 is shown with the guide rails 154 being illustrated in approximate horizontal alignment with the guide rails 18 of the storage racks. Each of the guide rails 154 on the carriage assembly 170 has an aligning means 160 at the end adjacent the aisle as shown in the detailed plan view of FIG. 12. The left aligning means 160 shown in FIG. 12 comprises a trapezoidal-shaped (as viewed from the top) channel member 180 having a similar cross section as the C-shaped channel member 19 forming the guide rails 18. The member 180 further includes a short section of rail at the bottom (not shown) similar to rail 26 in FIG. 13. Member 180 is pivotally coupled to the guide rail 154 by means of a pivot pin 185 and mounting bracket 186. A second bracket 187 is coupled to the member 180 and includes a roller 188 at the top edge thereof rotatably mounted to the bracket 187 by means of an axle 189. The bracket 187 includes a pivot pin 191 adapted to pivotally hold the end of a shaft 192 of a solenoid 195 mounted to the bracket 186.

As the mobile vertical lift is positioned in general alignment with the guide rails 18 of a predetermined aisle level, solenoids 195 are actuated such that both the left and right trapezoidal members 180 (FIG. 11) swing inwardly in a manner such that a downward extension of their leading edge 182 (FIG. 12) will contact the stop plate arm 33 (FIGS. 4 and 11) to swing the plate 24 downwardly and out of the way. The trapezoidal members 180 come into full contact with the rails 18 thereby joining the rails 18 with the rails 154 and completing the track over which a transfer vehicle can travel between the mobile vertical lift and the aisle.

To insure accurate alignment, the mobile vertical lift platform 150 is initially positioned such that the rails 154 are slightly above rails 18. As the members 180 are swung inwardly, the rollers 188 will fit within the tapered trough 183 formed by the plate 184 which is welded to the ends of the rails 18 as shown in FIG. 13. Once the solenoids 195 are actuated, the lift platform 150 is lowered somewhat to allow the rollers 188 to contact the inner surface 184' of the plate 184, thereby positively forcing the trapezoidal member 180 into aligned engagement with the rail 18. The laterally movable carriage assembly 170 allows the rails 154 and, therefore, members 180 to move such that alignment is achieved.

In this manner, accurate alignment between the rails of the mobile vertical lift and those of the aisles is accomplished. The trapezoidal member is held in vertical support by means of the flat bottom portion 181 (FIGS. 3 and 11) of the guide rails 18 which are not tapered as are the top portions of the C-shaped channel member 19 forming the rails 18. Thus, as the platform 150 is lowered into position, the rollers 188 in conjunction with the trough 183 assure horizontal alignment of the rails 154 with the rails 18 while the protruding bottom portion 181 of the channel members 19 contact the lower portion of the trapezoidal member 180 to assure vertical alignment and support between the rails 154 and 18.

Various sensors, limit switches, and other control devices are mounted to the mobile vertical lift 100 and the rack structure 10 as shown in FIGS. 5 and 11 to provide position information as well as various control functions. The explanation of these devices will be withheld until a description of the operation of the system is presented below. Having described the mechanical features of the mobile vertical lift, its horizontal and vertical drive mechanism, and its alignment mechanism; a detailed description of the transfer car and its structure will now be presented in conjunction with FIGS. 14 through 18.

Figure 14:
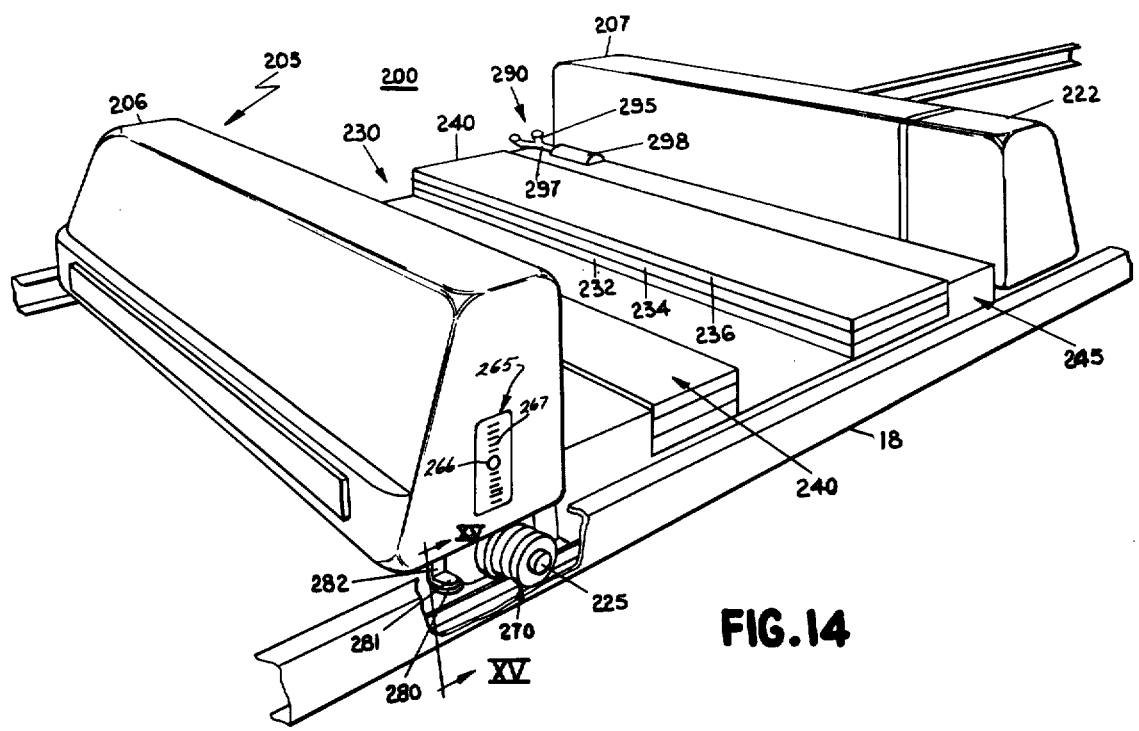
FIG. 14 is a perspective view of a mobile transfer vehicle.
Figure 15:
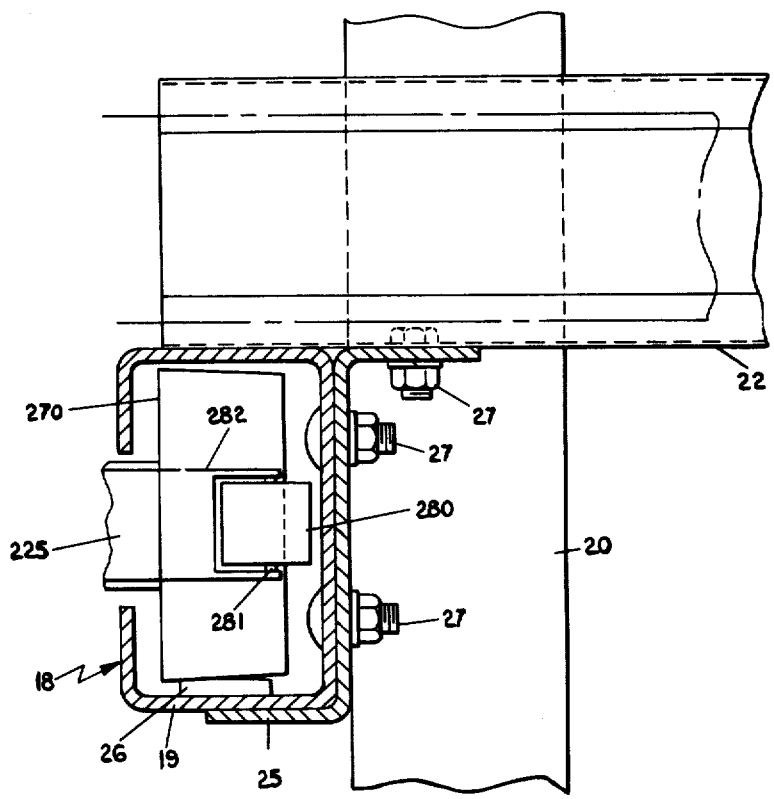
FIG. 15 is a partial cutaway detailed view of the wheel assemblies in the mobile transfer vehicle taken along the lines XV—XV shown in FIG. 14.

The mobile transfer vehicle comprises a frame assembly 220 (FIGS. 16 and 17) which is generally rectangular in shape and has rotatably mounted therein a front axle (not shown) and a rear axle 225. At each end of the axles is mounted a load support and guide wheel 270. These wheels travel along the guide rails 18 within the storage aisles, in the guide rails 375, 358 on the input and output stations, rails 154 on the mobile vertical lift 100, and rails 418 of bridge 400. As seen in FIGS. 14 and 15, an additional horizontally oriented guide wheel 280 is mounted adjacent each of the load carrying wheels 270 by means of a bracket 282 coupled to the frame 220 of the mobile transfer vehicle. The additional guide wheels 280 are rotatably mounted within the bracket 282 by means of an axle 281 and are located such that as the mobile transfer vehicle travels along the various guide rails, the wheels 280 will just clear the sides of the guide rails. Since one of these guide wheels 280 is used at each of the four corners of the vehicle, together they insure that the mobile transfer vehicle will remain relatively stable in the lateral direction as it moves along the rails 18. From time to time they may contact the inner surface of the guide rails 18 and thereby correct for any undesirable lateral displacement of the vehicle.

Coupled to the frame 220 of the mobile transfer vehicle 200 is a body 205 which may include raised portions 206 and 207 at opposite ends for housing some of the control and drive units employed with each mobile transfer vehicle. A removable battery pack 222 for supplying electrical energy to drive the various electrical motors is mounted at one end of the housing 207. The load transfer means 230 for transferring palletized loads comprises a pair of forks 240 each having base, middle and top sections 232, 234, and 236, respectively. The forks 240 can be simultaneously or individually raised and extended to either side of the transfer vehicle as described in detail below. Each of the forks 240 are mounted to a platform 245 which can be raised and lowered thereby elevating or lowering the forks 240.

Each of the mobile transfer vehicles 200 may include locating means 290 (FIGS. 14 and 16) comprising a forked element 295 coupled to a shaft 297 driven by actuation means 298. The operation of the locating means 290, if employed, is explained in greater detail with reference to FIG. 16 below.

Figure 22:
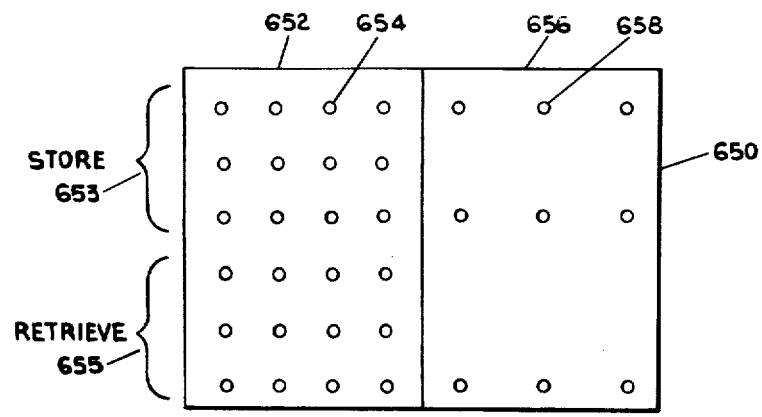
FIG. 22 is a diagram in pictorial form of an information transfer panel.

Each of the mobile transfer cars also includes sensing means 265 mounted on the end segment 206 of the body 205 to detect bin positions and identification indicia thereon by optical detection means. Sensors 265 include a light source 266 and a plurality of photoelectric detectors 267. In addition to the bin detecting sensor 265, each of the mobile transfer vehicles 200 includes information transferring means 650 (FIGS. 19 and 22) which interfaces with mobile vertical lift information transferring means as described below such that the mobile transfer car can be programmed from the mobile vertical lift and transfer diagnostic information to the lift when the mobile transfer vehicle 200 is in position on the lift 100.

Referring now to the detailed FIG. 15, there is shown a cutaway view of one of the vertical support members 20 which make up the storage racks 10 shown in FIGS. 1–3. Coupled to the vertical support member 20 is a horizontal bin support 22. Each bin comprises at least two supports spaced to receive a standard palletized load thereupon. Bolted to the supports 20 and 22 by means of bolts 27 is a Z-shaped bracket 25 which supports both the horizontal bin support 22 and aids in supporting the channel member 19 of guide rails 18. It is seen in FIG. 15 that the guide rail 18 is positioned somewhat below the horizontal bin support 22 such that the forks 240 (FIG. 14) are vertically positioned to allow them to slide under a palletized load when removing a pallet from a storage bin 21 as shown in FIG. 3.

The rail 26 which is welded to the bottom surface of the C-shaped channel member 19 forming the guide rails 18, is crowned somewhat as shown in FIG. 15 and each of the wheels 270 on the transfer vehicles 200 is tapered slightly as shown in FIG. 15 such that the transfer vehicle will be self-centering on the crowned rails 26. As noted above, the additional guide wheels 280 aid in stabilizing the transfer vehicles in a lateral direction in the event some lateral displacement occurs.

Although the preferred embodiment described employs a transfer vehicle 200 adapted to follow guide rails 18 within each aisle, in other embodiments, the transfer vehicle could be supported by horizontal floors between each storage level such as the horizontal fire barriers 30 shown in FIG. 2. In such an arrangement, the front edges of the storage bins would guide the vehicles along the aisle while the floor would provide support and vertical registration between the vehicles and the storage bins.

Figure 16:
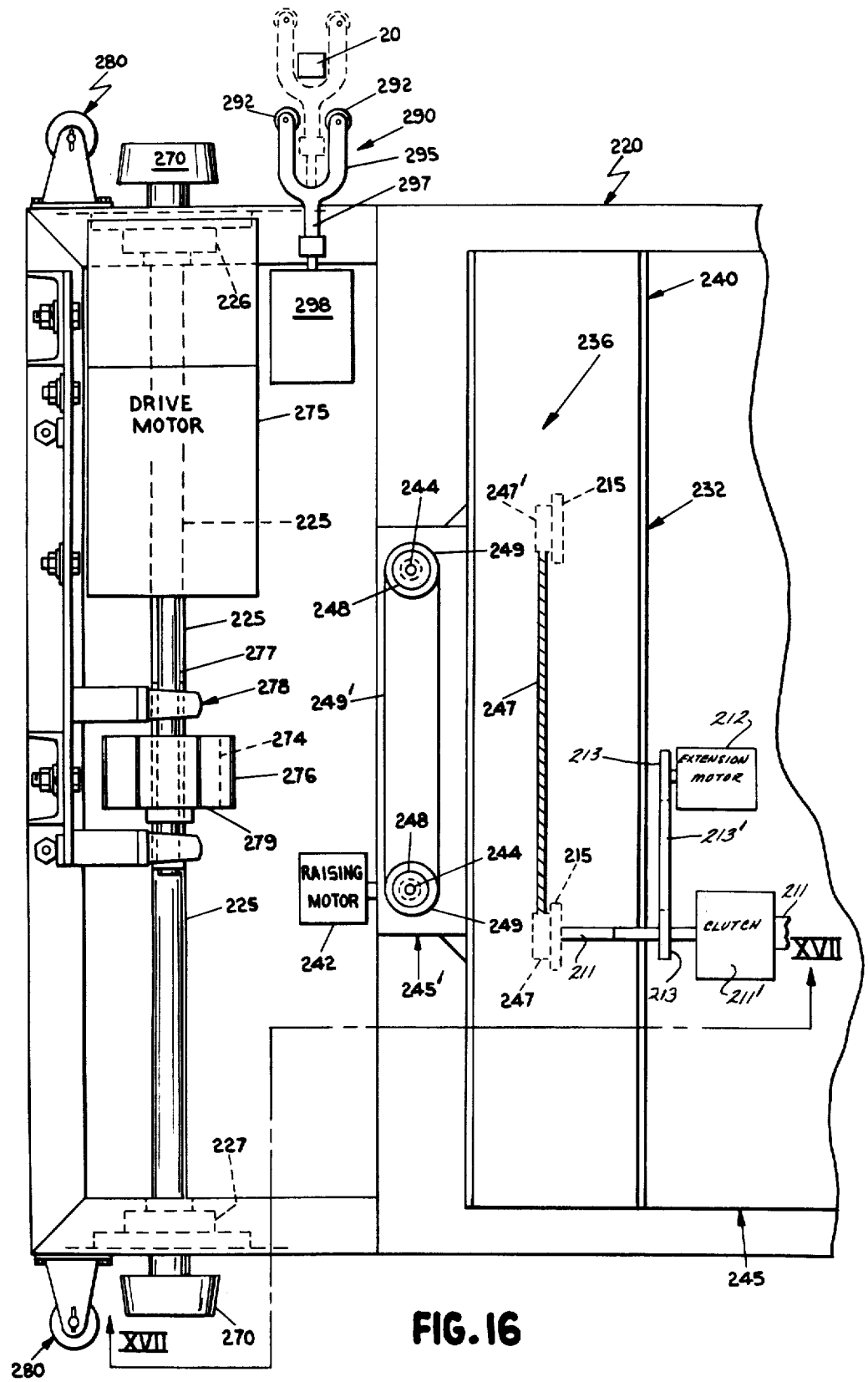
FIG. 16 is a partial plan view of a mobile transfer vehicle.
Figure 17:
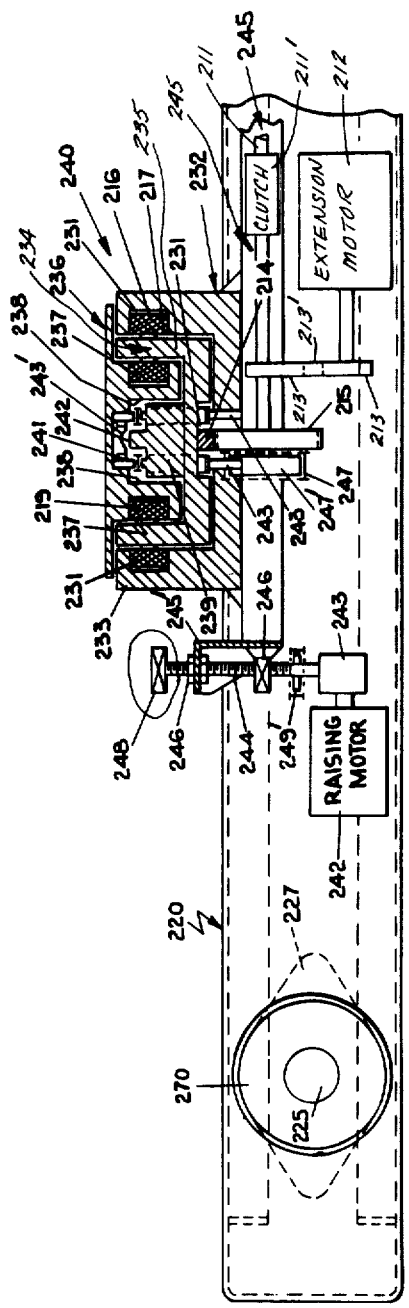
FIG. 17 is a sectional view partially in cross section taken along the lines XVII—XVII shown in FIG. 16.
Figure 18:
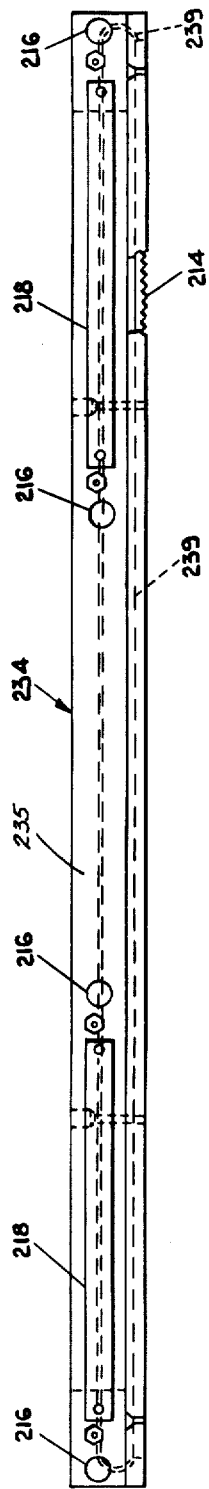
FIG. 18 is a side elevational view of a portion of the structure shown in FIG. 17.

Referring now in detail to FIGS. 16, 17 and 18, the structure and mechanical operation of the forks 240 and drive mechanism for a transfer vehicle 200 is presented.

As shown in FIG. 16, the drive motor 275 which is used to propel the transfer vehicle 200 along the various guide rails is coupled to the rear axle 225 of the transfer vehicle by means of a cog belt 276 coupled to a cog pulley 279 mounted on an axle 277 of the drive motor 275. A bearing block assembly 278 supports the shaft 277 on which the cog pulley 279 is mounted. A similar cog pulley 274 is mounted to axle 225 such that the rear axle 225 is positively engaged and driven by the cog belt 276 joining pulleys 274 and 279. The rear axle 225 is supported at either end by bearing block assemblies 226 and 227 as shown in FIG. 16. The drive motor 275 is a reversible direct current motor that receives energy from the rechargeable battery pack 222 (FIG. 14) mounted on the transfer vehicle. The motor 275 is controlled as described below to drive the transfer vehicles along the various guide rails of the system. In some systems where self-powered vehicles are not employed, variable speed A.C. motors can be used on the transfer vehicle and receive their operating power from a collector bar along the tracks and the sliding contact shoe on the transfer vehicle in much the same manner as the vehicle of the preferred embodiment receives D.C. power while at the input/output stations.

The locating means 290 which may be employed with the transfer vehicle 200 comprises a fork member 295 having a pair of rollers 292 at the end of each of the tines of the fork. The fork 295 extends from the side of the transfer vehicle at a position such that when it is retracted as shown in solid lines in FIG. 16, the rollers 292 clear the vertical support members 20 of the rack 10 so as not to interfere with the motion of the transfer vehicle. As the transfer vehicle stops in general alignment with one of the storage bins of the rack 10, the electrically operated actuation means 298 can be selectively controlled as described below to cause the shaft 297 to which the fork 295 is attached to extend outwardly to a position shown in dotted lines in FIG. 16 such that the tines of the fork member 295 straddle the vertical member 20 and cause the transfer car 200 to move slightly (if necessary) so that it is accurately aligned with the storage bin. This horizontal alignment facilitates the operation of the load transferring forks 240 which must fit under the pallet such that the palletized load can be transferred to and from the storage bin. It has been discovered that with the bin labels 11 (FIGS. 3 and 14A) which are detected by the transfer vehicle sensors 265 (FIG. 14) and the control for the transfer vehicle drive, sufficiently accurate positioning of the vehicle in alignment with the storage bins can be obtained and the locaters are unnecessary. In less complex vehicle drive control systems which, for example, employ only bin counting, the locaters are used and their operation will be discussed below.

Figure 19:
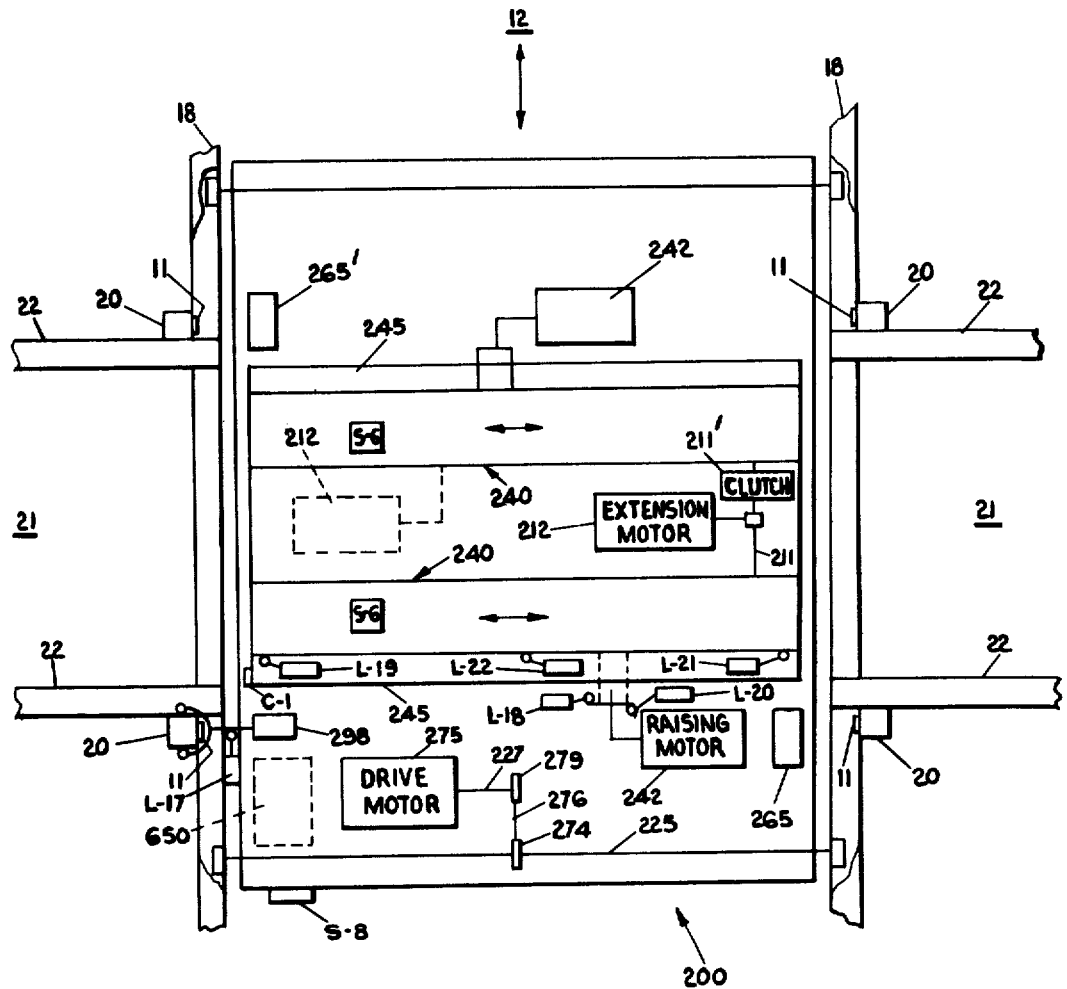
FIG. 19 is a plan view in schematic form of a mobile transfer vehicle showing the location of various sensors thereon.

The forks 240 are mounted on a platform 245 which is raised and lowered by means of a pair of raising motors 242 which drive threaded shafts 244 located at each corner of the platform 245 and coupled to the raising motors by means of gear boxes 243 (FIG. 17). FIGS. 16 and 17 show the details of the raising mechanism at one end of the platform 245 while FIG. 19 schematically shows both raising motors 242. The motors 242 are reversible direct current drive motors which receive power from the battery pack 222 on the mobile transfer vehicle and are simultaneously controlled as described below. The platform 245 is threadably mounted to each threaded shaft 244 by means of a bracket assembly 245' having a pair of vertically spaced threaded nuts 246 such that as the four shafts 244 rotate, the platform 245 will be raised or lowered. Supporting the rotating shafts 244 at either end are bearing block assemblies 248. A pair of sprockets 249 coupled to the shafts 244 and joined by a chain 249' drive each pair of shafts 244 at one end of platform 245 with a single raising motor 242. In some embodiments, platform 245 may be split into two sections and the raising mechanism designed to allow independent raising and lowering of each form 240 thereon.

The base member 232 of each fork 240 is rigidly secured to the platform 245 and is vertically movable therewith. The base 232 has a pair of vertical walls 233 with longitudinally extending channels 231 along their inner surface (FIG. 17). The base 232 also includes an open channel 231' in the bottom which extends the length of member 232 and allows the extension mechanism, which mechanically joins the middle and top sections 234 and 236 to the extension motor 212, to pass therethrough. The extension motor 212 is mounted to the platform 245 and is coupled to a drive gear 215 on shaft 211 by means of a pair of sprockets 213 between which is coupled a drive chain 213'. A clutch 211' is interposed in shaft 211 to permit one or both of the forks to be extended. The motor 212 is a direct current reversible motor driven by the same battery source as the remaining motors and controlled as described below.

A second or middle section 234 of each fork 240 is shown in detail in FIG. 18 and includes rack 214 along the bottom which has teeth adapted to engage the drive gear 215. The second section 234 is slidably mounted within the channels 231 in each of the vertical walls 233 of the base member 232. The sliding contact between the middle and base sections is accomplished by means of a plurality of rollers 216 which are rotatably mounted to the vertical walls 235 of the middle section 234, by means of axles 217. Also mounted on the outer edge of each of the vertical walls 235 of the middle section 234 are a pair of nylon guide plates 218 as shown in FIG. 18. These serve to provide additional support and prevent tilting of the second section 234 with respect to the base section 232 when the fork 240 is outwardly extended with a load thereon. As seen in FIG. 18, each end of the middle section 234 has a pair of guide rollers 216 and a guide plate 218 at each end of each side of the middle section.

As shown in FIG. 17, (which illustrates one of the two identical forks 240) the inner side of the vertical walls 235 of middle section 234 also includes a plurality of guide rollers 219 which are also coupled to axles 217 and are aligned with the rollers 216 on the opposite side of the vertical walls 235 of the middle section 234. These rollers extend into longitudinal channels 237 in the vertical walls 238 of the top section 236 of the fork 240. Nylon guides (not shown) are also mounted between the rollers 219 in a similar manner to the plates 218 shown in FIG. 18 but on the opposite side of the vertical walls 235 of middle section 234. Thus, the top section 236 can slide relative to the middle section 234 and be held in a stable position by means of the rollers 216, 219 and guide plates 218. The mechanism for extending the middle and top sections 234 and 236, respectively, by means of the extension motor is now discussed.

As noted above, the shaft of the extension motor is coupled to the gear 215. This gear positively engages the rack 214 on the middle section 234 such that the middle section can be extended from either side of vehicle 200 to reach a storage bin 21 on either side of an aisle. A pair of chains 239 longitudinally span the middle section 234 (FIG. 18) and are held in aligned slidable engagement to the middle section 234 by means of the guides 241 which are integrally formed with a center block 242 secured to the middle section 234 (FIG. 17). The bottom section 232 includes a pair of racks 243 which have upwardly directed teeth adapted to engage the individual links of the chains 239 such that the bottom portion of the chain will engage the racks 243 of the base section 232 as the middle section 234 is extended by means of the rack 214 and rotating gear 215. As the middle section travels outwardly, however, the chain is allowed to rotate longitudinally around the guides 241 of the center section and a pair of racks 243' mounted to the top section 236 having downwardly directed teeth adapted to engage the individual links of the chain 239, cause the rotating chain to extend the top section 236 outwardly relative to the middle section 234. Thus, as the extension motor 212 drives the gear 215, the middle section 236 is driven outwardly and at the same time, the top section is driven outwardly at a greater rate relative to the base by means of the pair of rotating chains 239 mounted to the middle section 234 by the links that engage the racks 243' in the top section 236.

Both forks 240 are driven by axle 211 coupled to extension motor 212 (FIGS. 16 and 19) and a pair of gears 215 which are joined by means of an additional chain 247 which engages sprockets 247' that are coupled to the drive gears 215. In this manner of coupling therefore, one extension motor 212 is employed to extend each of the forks 240 to the left or to the right side of the transfer vehicle 200. Clutch 211' permits the extension of only one fork which is desirable when half sized pallet loads are stored in the bins and only one fork is required to remove them. In some embodiments, it may be desirable to independently operate the forks. In such case, a pair of extension motors 212 (the second motor shown in phantom in FIG. 19) are coupled to drive gears on the forks which then can be independently operated in either direction. In this arrangement, clutch 211' is eliminated.

Thus, it is seen by the mechanism shown in FIG. 16 through 19, each fork 240 is vertically movable and extendible to either side of the transfer vehicle such that a load can be lifted by the vehicle, extended into a storage bin, and then lowered until the pallet contacts the horizontal bin supports 22 (FIG. 15). The forks are then retracted onto the transfer vehicle leaving the pallet load in the bin. Likewise, the forks can be extended first under the pallet load in the bin, raised to lift the pallet load from the storage bin supports and retracted to bring the pallet back to the transfer vehicle. In this manner, palletized loads are transferred between the mobile transfer vehicle and the storage bins as well as the input-output conveyors and other interface equipment. The forks are described in greater detail in a co-pending application entitled "MOBILE TRANSFER VEHICLE AND LOAD TRANSFERRING MEANS THEREFOR", assigned to the present assignee and filed concurrently herewith.

Having described the mechanical design and physical operation of the various parts of the mobile vertical lift, the mobile transfer vehicle and the storage racks; a description of the operation of the system to store and retrieve palletized loads is now presented. First, a discussion of the store or input mode of operation in conjunction with the various sensors on the vehicles and at various other locations in the system is presented. Reference is had to FIGS. 1, 3, 5, 11, and 19–23, which schematically show the location of the vehicle sensors and associated means which operate the sensors mounted on the storage racks.

For the purpose of initiating the description of the devices operation, it is assumed that the mobile vertical lift 100 is not at the home station 300 but is somewhere along the aisle 120 as shown in FIG. 1. It is also assumed that a palletized load 210 is entering the input station 320 by means of the conveyor 322. It is desired to store the incoming load 210 in a predetermined storage bin. The first step in the storage mode of operation is to position a mobile transfer vehicle on the rails 375 at the input station 320 such that the forks 240 on the mobile transfer vehicle 200 can transfer the palletized load 210 from the input station 320 to the mobile transfer vehicle.

Figure 20:
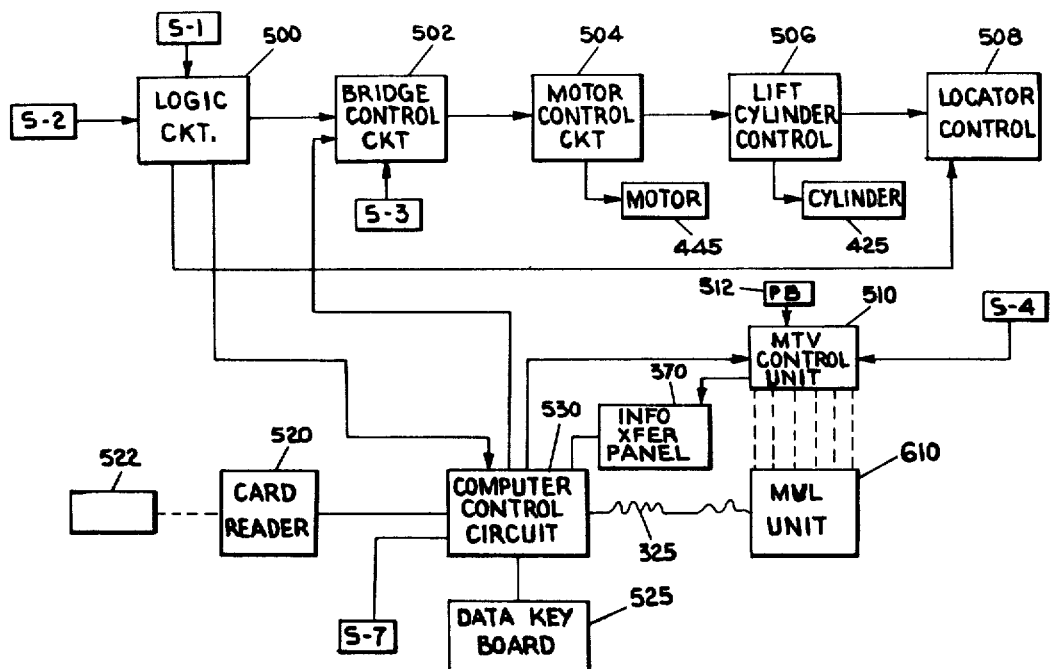
FIG. 20 is an electrical circuit diagram in block form of a portion of the control circuit used with the present invention.

Referring now to FIG. 20, which is a combined logic flow diagram and electrical control circuit diagram, the first operation necessary in the store mode of operation of the system is to position the transfer car at the home station 320. A sensor S-1 (FIG. 1) which may be an optical sensor is located at the end of input conveyor 322 so as to provide a signal indicating the presence or absence of a palletized load 210 thereon. Sensor S-1 is coupled to a first logic circuit 500. A second sensor S-2 (FIG. 1) is likewise coupled to the logic circuit 500 and is physically located adjacent the tracks 375 at input station 320 and detects the presence or absence of a transfer car 200 at the input station. The sensor S-2 provides an output signal indicative of this information which is also applied to circuit 500. If a palletized load is present at the end of conveyor 322 and, if the signal from S-2 indicates that a T-Car is not present at the input station 320, the logic circuit 500 will provide a control signal which is employed to actuate the retractable bridge 400 such that a transfer vehicle 200 can be brought across the bridge from the storage magazine 350.

A bridge control circuit 502 (FIG. 20) receives an actuation signal from the logic circuit 500 and simultaneously receives a signal from a sensor S-3 (FIG. 1) which is an optical sensor placed adjacent the bridge area and provides a signal indicating the presence or absence of the mobile vertical lift 100 at the home station 300. If the mobile vertical lift 100 is not in the way of the bridge 400, the bridge control circuit 502 will provide an electrical actuation signal which is applied to a motor control circuit 504 which actuates the bridge motor 445 (FIG. 3) to extend the retractable bridge 400 outwardly across the monorail 16. After the bridge is extended, the motor control circuit develops a signal applied to circuit 506 to actuate the lifting cylinders 425 such that the guide rails 418 associated with the bridge 400 will be elevated and vertically aligned with the guide rails 375 of the input station and the guide rails 358 of the magazine 350.

Once the guide rails 418 are in position, circuit 506 develops a signal which is applied to circuit 508 to actuate the locators 410 at the end of each guide rail 418 such that they swing into place to securely lock the bridge guide rails 418 to the guide rails 358. Once the locators 410 are positioned, a sensor S-4, (FIG. 3) which may be a limit switch that detects the locked-in position of the locators 410, provides an enabling signal which permits an operator at station 330, or if fully automatic operation is employed, the computer to actuate the first one of the mobile transfer vehicles 200 in the storage magazine 350 or at the output station 340 (FIG. 1) to cross the bridge. This is accomplished by coupling the output of sensor S-4 and a command signal from a push button switch 512 or the computer to a mobile transfer vehicle control unit 510 which is coupled to an array of optical information transmitting means 370 (FIG. 1) located adjacent the output station 340 of the transfer vehicle magazine 350. Light sources in an array on the unit 370 are in a position to actuate optical sensing means 650 (FIG. 19) mounted on the mobile transfer vehicle 200. The optical interface between the transfer vehicle 200 and the storage magazine 350 is identical to that of the transfer vehicle and the mobile vertical lift 100 and will be described in detail below with reference to the operation of the mobile transfer vehicle and in conjunction with the mobile vertical lift. It is sufficient for the understanding of the operation of the storage magazine, however, to note that the circuit 510 will actuate the drive motor of the mobile transfer vehicle in the storage magazine 350 causing the vehicle to move in the proper direction across the bridge tracks 400 and to the input station 320 on rails 375. At the same time, another transfer vehicle (if any) in the magazine 350 is automatically advanced to the output station 340. This can be accomplished by a gravity feed arrangement by mounting tracks 358 on an angle and providing a retractable stop at the output station, or by other means.

Once the mobile transfer vehicle 200 is at the input station, sensor S-2 detects the vehicle and applies a signal to the logic circuit 500 which responds thereto to apply a signal to circuits 502 and 508 to retract the bridge 400 out of the way such that the mobile vertical lift 100 can be brought to the home station 300 and receive the transfer vehicle 200. Simultaneously, while the bridge 400 is being retracted, the mobile transfer vehicle 200 is programmed at the input station 320 by the optical interface to automatically extend the forks 240 by the mechanism described above in conjunction with FIGS. 16–18 to fit under the palletized load 210 at the end of the input conveyor, lift the load, retract the forks to the transfer vehicle 200. After the bridge 400 has been retracted, the mobile vertical lift is controlled to return to the home station 300 either by the operator or automatically by the computer.

The palletized load 210 will include an information card as to the nature of the load, its quantity, and possibly the storage bin location. In a semi-automatic operation, the operator will read the information and choose the storage location and address and type it into the computer control circuit 530 by means of a data keyboard 525 (FIG. 20), at the operating station 330. In a fully automatic system, this information is punched into a computer data card accompanying the load 210. The operating station 330 includes a data card reader 520 which receives the punched computer card and from the identification of the type of goods and the quantity, will transmit data signals to a computer in a computer control circuit 530. A memory core in circuit 530 provides a continuous inventory of goods presently in the storage racks 10 and their particular location. With the information from a data card 522 (FIG. 20) associated with each incoming pallet load 210, the computer control circuit 530 develops a signal which is applied to the mobile vertical lift control unit 610 on the mobile vertical lift via festoon cable 325 (FIG. 2). The signal includes information employed to program the mobile transfer vehicle 200 to move onto the mobile vertical lift 100 at the home station 300. The signal also includes information programming the travel of the mobile vertical lift to the desired aisle and aisle level for dispatching the mobile transfer vehicle. Simultaneously, the receipt of the articles comprising load 210 is entered into the memory to update the inventory information.

The signal applied to the mobile vertical lift control unit 610 from the computer control circuit 530 can take the form of a binary coded decimal signal, a stream of data bits, or other formats depending upon the particular design choice. Before describing the movement of the mobile vertical lift and the mobile transfer vehicle in the store mode of operation of the system, it is important to note that the system although particularly well adapted to be automatically operated as described thus far can be semi-automatically operated by an operator by employing a data keyboard 525 which is coupled to the computer control circuit 530. For example, as a load enters the input area, the operator can visually check the position of the mobile vertical lift, the transfer vehicles, and the retractable bridge from his operating station and type an appropriate data control signal into the computer control circuit 530 by means of the keyboard 525 to control the position of the vehicles and the bridge. The computer control circuit 530 is coupled to the logic circuit 500 and to the mobile transfer vehicle control circuit 510 at the output station 340 such that the operator can control the bridge and mobile transfer vehicles in the storage magazine from the operating console. He also can control the position of the mobile vertical lift in a similar manner.

Figure 21:
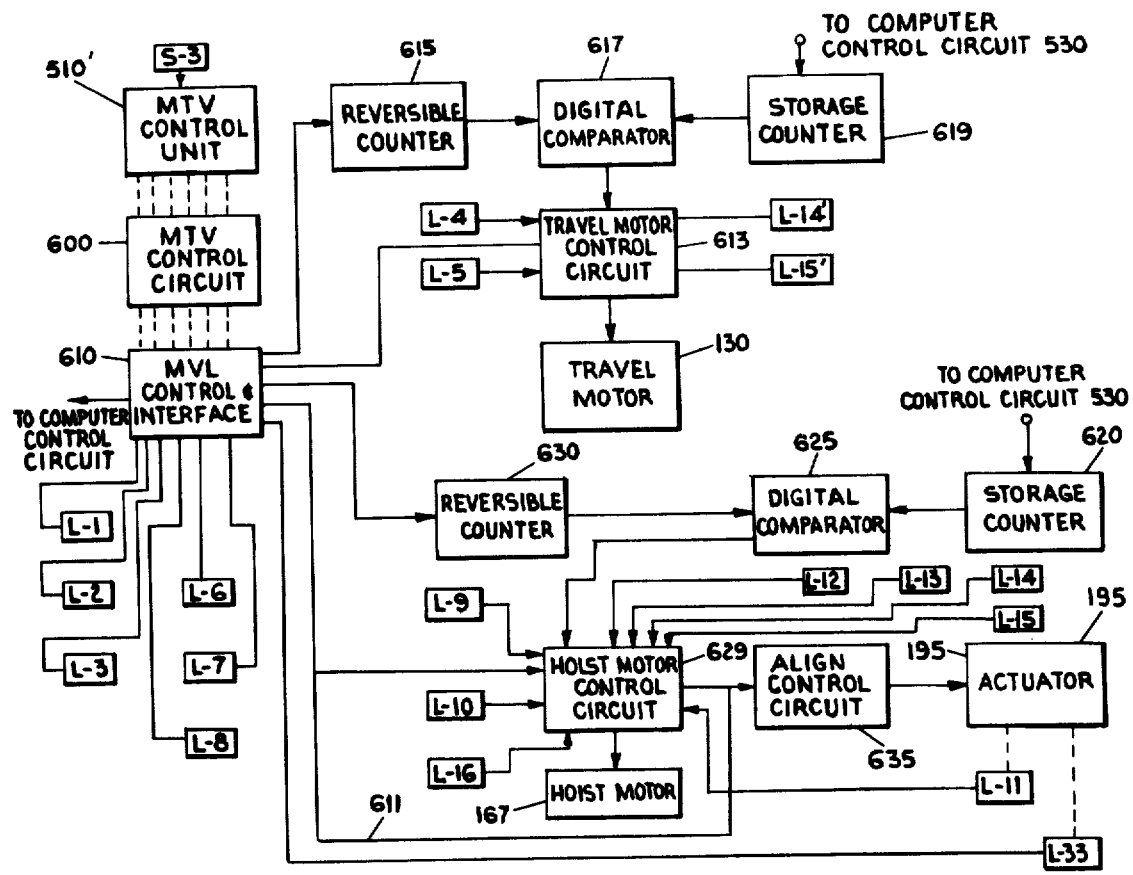
FIG. 21 is an electrical circuit diagram in block form of the control circuit for the mobile vertical lift.

Referring now to FIG. 21, it is seen that once the mobile vertical lift 100 has returned to the home station under the command of the computer control circuit 530, and the mobile transfer vehicle has been loaded and is at the input station 320 (FIG. 1) adjacent the home station; the sensor S-3 detects the presence of the mobile vertical lift 100 and provides a control signal to the mobile transfer vehicle control unit 510' which is associated with the input station 320 and which includes an optical interface 370 (FIG. 1) which aligns with the information panel 650 included in the transfer vehicle control circuit 600 located on each mobile transfer vehicle 200. The optical coupling between units 510' and 600 is indicated by the dashed lines in FIG. 21 between the units.

The panel 650 on each of the mobile transfer vehicles 200 can be mounted on the sides or bottom of the vehicle (FIG. 19) and the units 370 are mounted adjacent or under the guide rails such that when the vehicle 200 is at the input or output station or other locations; the units will be aligned so information can be exchanged therebetween. It is noted here that the lifting platform 150 on the mobile vertical lift is lowered when the lift is at the home position such that the guide rails 154 on the carriage assembly 170 are aligned with the guide rails 375 once the sensor S-3 detects the presence of the mobile vertical lift. The carriage assembly 170 (FIG. 11) is, therefore, in position to receive the mobile transfer vehicle 200. The aligning wedges at the end of rails 154 (not shown) accurately couple rails 154 to rails 375.

Having received the signal from the S-3 sensor, the circuit 510' actuates the mobile transfer vehicle which moves onto the mobile vertical lift. The mobile transfer vehicle automatically senses its position on the mobile vertical lift as discussed below and when properly positioned, the drive motor for the mobile transfer vehicle is deactivated with the vehicle 200 resting upon the mobile vertical lift 100. The locating means 290 (FIG. 14) on the mobile transfer vehicle 200 can be extended to engage a frame member on the lifting platform 150 (FIG. 10) such that the mobile transfer vehicle is locked into the mobile vertical lift 100. The control and positioning of the mobile transfer vehicle onto the mobile vertical lift is described in greater detail when the description of the operation of a mobile transfer vehicle within an aisle is presented, the operations being substantially identical.

The control and interface circuit 610 is located on the mobile lift 100 such that once the mobile transfer vehicle 200 is properly positioned on the lift, the information panel associated with the circuit 610 and the information panel 650 of the mobile transfer vehicle control circuit 600 (FIGS. 11 and 19, respectively) will be physically aligned such that the optical information transfer means can effectively communicate information between the two vehicles by means of light sources and sensors contained therein as described below.

The mobile vertical lift control circuit 610 is coupled to the computer control circuit 530 as shown in FIG. 20. Once the mobile transfer vehicle is properly positioned on the carriage assembly 170 and, therefore, on platform 150, a limit switch L-1 (FIG. 11) on the lift 100 is contacted by a cam member C-1 (FIG. 19) on the mobile transfer vehicle 200 to actuate the switch. Switch L-1 is electrically coupled to the mobile vertical lift control circuit 610 to provide a signal to the control circuit indicating that the mobile transfer vehicle 200 is properly positioned and the mobile vertical lift can proceed along transverse aisle 120 (FIG. 1) to the pre-programmed aisle and elevate the transfer vehicle to the desired level. The motion of the mobile vertical lift is programmed by, for example, storing a predetermined count from the computer that corresponds to the desired aisle and bin level in a storage counter. The digital count in the storage counter is also applied to a digital comparator which compares the count on this input with the count from a reversible counter whose count varies with the movement and actual position of the lift 100 by employing sensors which detect the position of the lift 100. As the mobile vertical lift 100 travels along aisle 120, the counter is decremented or incremented as the mobile vertical lift sensors detect each aisle and level as explained below until the counts compared by the comparator are identical. At this time, the comparator provides a control signal to stop the motion of the mobile vertical lift. A similar arrangement can be employed to control and to determine the vertical position of the lift platform 150. Thus, a pair of digital comparators, storage and reversible counters together with the conventional control circuits can be employed to cause the mobile vertical lift to move along aisle 120 as well as to elevate lifting platform 150.

Referring now to FIGS. 5 and 11, 21, 22 and 23; the sensors to determine the vertical and horizontal position of the mobile vertical lift which are on the mobile vertical lift as well as mounted to the storage racks on the end adjacent the aisles 120 will be discussed in conjunction with the associated control circuits.

First, the controlled horizontal motion of the mobile vertical lift down an aisle is discussed. As shown in FIG. 11, there are four limit switches L-2 through L-5 which are mounted to the lift 100 and are associated with cams C-2 through C-5, respectively, which can conveniently be mounted in a vertically spaced array to the horizontal support rails 22 (FIG. 3) or extension thereof at the end of the storage bins 10 adjacent aisle 120. These cams can be raised members of various lengths to selectively actuate associated limit switches as the mobile vertical lift travels along the monorails 14 and 16. The limit switches are electrically coupled to the control circuits as shown in FIG. 21 to provide position information to the circuits. For simplicity, a discussion of the control circuits will be limited to a three-aisle system, it being understood that additional aisles will be actually employed in a warehouse system and several additional limit switches will be employed to uniquely identify each aisle.

The first two limit switches L-2 and L-3 are adapted to be actuated by the cams C-2 and C-3 to provide a signal indicating alignment of the lift 100 with any one of three possible aisles. For a system servicing a greater number of aisles, additional cams can be added. As the mobile transfer vehicle is propelled down the aisle 120 by means of the actuation of drive motor 130 by the mobile vertical lift control circuit 610, the limit switches L-2 and L-3 will be actuated by the presence or absence of corresponding cam members forming C-2 and C-3. As the actuation of these two limit switches occurs, the count feed to a reversible counter 615 from circuits 610 (FIG. 21) changes to correspond to the digital count assigned to identify the aisle corresponding to the position of the mobile vertical lift 100 before it reaches the desired aisle. It is noted here that in a fully automatic system, the counters and comparators can be incorporated into the computer control. It is also noted here that any desired signalling system can be employed to control the motion of the mobile vertical lift to the desired aisle. Magnetic, optical or other sensing systems could be employed in place of the mechanical system described herein.

Once the mobile vertical lift has passed the aisle prior to the desired aisle, the limit switches will be actuated to provide a count to the digital comparator 617 which corresponds to the preset count feed to the digital comparator from the computer circuit 530 via storage counter 619. As this occurs, the digital comparator develops a control signal applied to a drive or travel motor control circuit 613 which simultaneously actuates the circuits associated with the limit switches L-4 and L-5. Cam C-4 is positioned to actuate limit switch L-4, as the lift 100 approaches the desired aisle. With L-4 actuated, the drive motor 130 slows down thereby decreasing the speed of the mobile vertical lift 100. As the mobile vertical lift comes into general alignment with the guide rails 18 of the desired aisle, cam C-5 is positioned to actuate the limit switch L-5 which provides a stop signal to the motor 130 thereby deactuating the motor and causing the mobile vertical lift to stop in approximate alignment with the desired aisle. Critical alignment is unnecessary due to the design of the platform 150 with the carriage assembly 170 and aligning means 160 thereon described below. In this manner, therefore, the mobile vertical lift can be programmed to travel to a desired aisle. Once the transfer car has been discharged therefrom, the mobile vertical lift can receive a command from the computer 530 to return to the home station 300 or any other position. The command changes the count on the storage counter 619 to correspond to the desired aisle location or home position and the mobile vertical lift is actuated to travel to the new position. In some cases, the mobile vertical lift 100 will not be needed elsewhere and can await the return of the mobile transfer vehicle. Having described the horizontal motion of the mobile vertical lift along aisle 120, a description of the operation of the lift platform 150 on the lift 100 is presented.

The computer control circuit 530 shown in FIG. 20 also programs the mobile vertical lift control unit 610 with information as to the aisle level at which the transfer car thereon is to be discharged. This is accomplished by a second storage counter 620 which receives a predetermined count from computer control circuit 530 corresponding to the desired aisle level. The count so stored in counter 620 is coupled to one input of the digital comparator 625 which receives a second count input from a reversible counter 630 whose count is controlled by the limit switches L-6, L-7 and L-8 shown in FIG. 5. These limit switches are mounted to the lift platform 150. Cams C-6, C-7 and C-8 are mounted to the vertical support member 104 of the mobile vertical lift 100 and are positioned at levels corresponding to the desired aisle heights in a plurality of groups of cams C-6 through C-8 mounted to the vertical support member 104 as shown schematically in FIG. 5. Each of the limit switches L-6 through L-8 can be weighted as, for example, by 1, 2 and 4 bit weighting such that a digital code is formed thereby which uniquely identifies up to seven aisle levels, it being understood that to increase the number of aisle levels, it is only necessary to increase the number of limit switches and associated cams. The limit switches are electrically coupled to the circuit 610 to provide a count uniquely identifying each aisle level as the lifting platform 150 approaches the aisle level.

The hoist motor 167 (FIG. 5) is actuated by the circuit 610 via a motor control circuit 627 as the mobile vertical lift 100 leaves the home station 300. As the lift passes the aisle level just prior to the desired aisle, the digital comparator 625 senses coincidence of counts from the storage counter 620 and the reversible counter 630 to provide a control signal to energize limit switches L-9 and L-10 shown mounted on the platform 150 on the right side of FIG. 5 which operate to stop and slow down the vertical travel of the lift platform 150 in the same manner as limit switches L-4 and L-5 slow down and stop the horizontal motion of the mobile vertical lift 100. Thus, cams C-10 and C-9 are mounted on the mobile vertical lift support member 104 in groups as indicated schematically in FIG. 5 and are positioned to contact the associated limit switches L-9 and L-10 to slow down and stop the lift platform 150 as it reaches the desired aisle level.

The hoist and travel motors 167 and 130 respectively, receive initial actuation control signals from circuit 610 via their respective control circuits. In some installations, the speed of the motors can be varied inversely as the difference between the counts in the storage and reversible counters. Thus, if the lift has a long way to travel, the speed of the drive motor is initially fast and can be continuously or incrementally slowed as it approaches the desired aisle as evidenced by a decreasing count difference. In such an installation, the digital comparators have an output coupled to circuit 610 to vary the drive signals and the motor speeds accordingly.

It is noted that cam C-9 is positioned to control the hoist motor 167 such that the lift platform stops when the rails 154 on the carriage assembly 170 associated with the lift platform 150 are slightly above the aisle rails 18 of the desired aisle level. Lift platform 150 is stopped in this position to allow the locating means 160 on the platform (FIG. 11) to accurately position the guide rails 154 with the rails 18 before slightly lowering the platform 150 to seat the rails 154 to the rails 18 as now described.

The hoist motor control circuit 627 generates an actuation signal which is applied to an align control circuit 635 once the lift platform 150 of the mobile vertical lift 100 has stopped. Circuit 635 energizes the actuators 195 (FIGS. 11 and 12) to cause the pair of trapezoidal members 180 to swing inwardly. Once they are horizontally positioned, a limit switch L-11 (FIG. 11) is contacted and actuated. Switch L-11 is electrically coupled to the hoist motor 167 via control circuit 627 to cause the hoist motor to lower lift platform 150 slightly as the roller 188 of the locating means 160 travels within the trough 183 (FIGS. 12 and 13). The trapezoidal members 180 thereby settle upon the flat surface 181 of the guide rails 18 (FIGS. 11, 12 and 13). The tension in the lifting cable 162 (FIG. 5) is detected by the limit switch L-12 which is also coupled to the control circuit 627 and deactivates the hoist motor 167 once the rails 154 on the carriage assembly 170 have been seated to the guide rails 18 of the desired aisle. In this manner, therefore, the platform 150 and carriage assembly 170 thereon is eased into accurate horizontal and vertical alignment by means of the aligning means which control the hoist motor to vertically align the rails, and moves the carriage assembly 170 to the left or right on the pivot 175 to horizontally align the rails.

In addition to the limit switches already discussed, the mobile vertical lift 100 includes additional limit switches such as the switch L-13 (FIGS. 5 and 21) which inactivates the hoist motor in the event that an excessive load is present on the lift platform 150. This switch thereby provides overload protection by preventing the actuation of the hoist motor 167. Also electrically coupled to the hoist motor 167 is a lower travel limit switch L-14, (FIGS. 5 and 21) and an upper limit travel switch L-15 both of which are physically mounted to the lift 100. Left and right end travel limit switches L-14' and L-15' (FIG. 11) are coupled to the drive motor control circuit 613 (FIG. 21) and prevent the mobile vertical lift 100 from traveling beyond the ends of rails 14 and 16. An over travel limit switch L-16 mounted above switch L-15 is electrically coupled to motor 167 and will activate the hoist motor momentarily in reverse to lower platform 150 slightly in the event that an over travel exists due to the momentum of upward travel of the platform 150 after the motor has been shut off by L-15, or if L-15 should fail to operate. An additional protective feature is detector S-5 which senses the cable tension. In the event the cable 162 breaks, the detector S-5 provides a control signal to stop the motor. Devices on the platform 150 sense broken cable and actuate mechanical means (not shown) which freezes the position of the lift platform 150 within the frame of the mobile vertical lift 100.

The store mode of operation of the system is continued after the mobile vertical lift 100 and loaded transfer vehicle 200 is aligned with the predetermined aisle and aisle level by discharging the mobile transfer vehicle 200 from the mobile vertical lift 100. During the interval in which the mobile vertical lift 100 is traveling from the home station where it picked up the loaded transfer vehicle and arrived at the predetermined aisle bin and location, the computer control circuit 530 has provided the mobile vertical lift control and interface circuit 610 with programming information for the mobile transfer vehicle. Thus, the mobile transfer vehicle will receive information as to which particular storage bin 21 it is to travel and to which side of the aisle the palletized load 210 is to be transferred. The programming of the mobile transfer vehicle is accomplished by means of the information transfer panel 650 which is part of the mobile transfer vehicle control circuit 600 and is mounted on the mobile transfer vehicle as shown schematically in FIG. 19. This panel is shown in detail in FIG. 22.

The information transfer panel 650 has a left side 652 which comprises an array of individual photoelectric detectors 654, and right side 656 comprising an array of light sources such as light emitting diodes 658. The left side 652 is divided into an upper region 653 and a lower region 655 corresponding to store and retrieve modes of operation, respectively. It is noted that the mobile vertical lift, and each of the input and output stations have similar information transfer panels with the light sources and detectors reversed so a light source on the transfer vehicle will be aligned with a light detector on the information panel, the input or output station, or the mobile vertical lift; and vice versa. In some embodiments, it may be desired to provide each aisle end with an information transmitting panel 370 (two shown in FIGS. 1 and 2) so that instead of programming the mobile transfer vehicle while on the lift, it is programmed after it leaves the lift and is within an aisle. In such an arrangement, each aisle end panel 370 is coupled to the computer control to receive programming information which is then transferred to the vehicle via panels 370. The panels have an array of light emitting diodes and an array of photoelectric detectors which align with and correspond in position to the array of photoelectric detectors 654 and light emitting diodes 658, respectively, on the panel 650 of the mobile transfer vehicle. Thus, when the transfer vehicle 200 is on the mobile vertical lift 100, on the input or output station or at an aisle end; the information panel 650 will be aligned with a corresponding information transfer panel and enable the transfer of information between the two panels by the optical means thereon.

The array of photoelectric detectors on the left side 652 of panel 650 (FIG. 22) receive information from a mini-computer in the computer control circuit 530 by means of the mobile vertical lift control unit 610 which has an information transfer panel 350' (FIG. 11) coupled thereto. A predetermined number of the photoelectric detectors 654 in the upper array 653 are assigned the function of receiving information as to the bin location to which the mobile transfer vehicle 200 is to travel once discharged from the vertical lift 100. Another one or two of the photoelectric detectors 654 is employed to receive information as to whether the load transferring forks 240 of the mobile transfer vehicle are to extend to the left or to the right side and if one or both forks are to be employed. Finally, one or more of the detectors 654 receives information as to whether the mobile transfer vehicle is to store or retrieve to control the sequence of operation of the load transferring forks 240. By using two sections 653 and 655, the transfer vehicle can first store a palletized load and then retrieve another load without requiring a return trip to the mobile vertical lift or aisle end for new information. The operation of the mobile transfer vehicle as it is discharged from the mobile vertical lift and travels down an aisle is best understood by referring to FIGS. 14, 14A, 19 and 23 which show the various sensors employed with the mobile transfer vehicle and the control circuits used therewith to control the operation of the drive mechanism on the mobile transfer vehicle.

As the mobile vertical lift travels down aisle 120 to the preassinged aisle and aisle level, the array of lights on the information panel thereon are actuated to actuate the corresponding array of photoelectric detectors 654 on the mobile transfer vehicle such that a digital count is entered into the counter 660 and a binary number corresponding to the bin into position store 660', both circuits being coupled to the panel 650. The stored count and binary number corresponds to and uniquely identifies the desired bin location at which the load is to be stored. Each of the vertical support members 20 on one side of the aisle (FIGS. 3 and 15) forming the storage rack of the storage system, have a column label 11 (FIGS. 3 and 19), one of which is shown in detail in FIG. 14A.

Figure 14A:
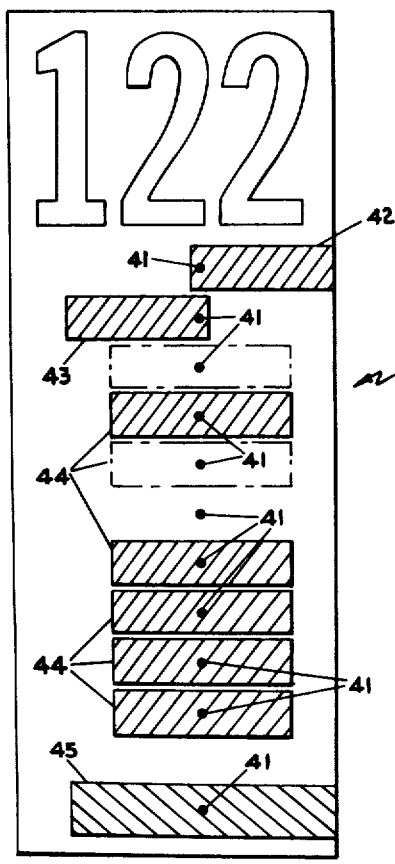
FIG. 14A is a front elevational view of one of the column labels employed to uniquely identify each storage bin.

Referring now to FIG. 14A, it is seen that each column label 11 includes a unique man readable bin number at the top area 40. The labels are printed on nongloss self-adhering paper which forms a label which can be applied to a vertical support at each bin location. Just below area 40 are left and right centering bars 42 and 43 respectively which are black rectangular areas offset as seen in the figure. Dots 41 on the various label areas indicate the center of view of various photodetectors employed to read the information on the label. The centering bars are detected by a pair of vertically spaced photodetectors on the transfer vehicle sensor 265 to provide control signals to the transfer vehicle drive motor via logic circuit 672 (FIG. 23) to provide creep left or creep right speed control for accurate final alignment of the transfer vehicle with a desired bin as explained below.

Figure 23:
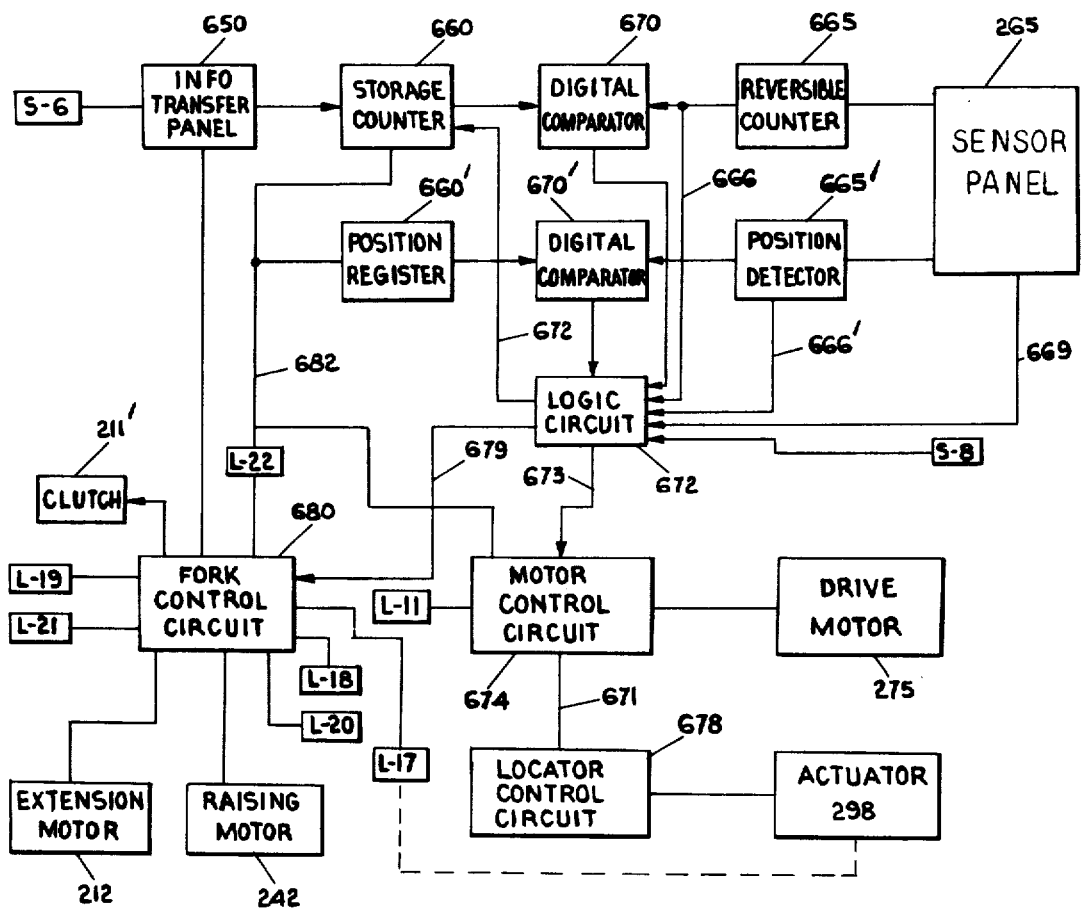
FIG. 23 is an electrical circuit diagram in block form of the control circuit for a mobile transfer vehicle.

Below the centering bars on label 11 are a series of seven vertically spaced areas 44 which are selectively blackened to provide a unique 7 bit binary coded position signal to the position detector circuit 665' (FIG. 23). This provides a bin check in addition to the counting scheme as described below.

Finally, below the areas 44, each label 11 includes a reflective strip 45 which is detected by a sensor on the transfer vehicle sensor panel 265 to increment or decrement reversible counter 665 (FIG. 23) thereby counting the bins as the transfer vehicle travels along an access aisle. The sensor panel 265 on the transfer vehicle (FIG. 14) includes a light source 266 which sends a beam of light outwardly from the vehicle 200 to illuminate the entire label 11. Panel 265 includes also a plurality of photoelectric detectors 267 which are vertically spaced to register with the centering bars, the code areas and the reflective tape area of label 11. In this manner, therefore, accurate bin counting and bin identification information is obtained by the mobile transfer vehicle. The stored digital count programmed into the storage counter 600 and the actual representative of the position of the transfer vehicle is fed to a digital comparator 670 that provides a difference count. The output of comparator 670 is coupled to a logic circuit 672 which provides an enabling signal applied to the drive motor control circuit 674. Circuit 674 provides an actuation signal to the transfer vehicle drive motor 275 (FIG. 16) when the preset count differs from the actual position count.

The limit switch L-11 (FIGS. 11 and 21) is also coupled to the motor control circuit 674 and serves to actuate the motor 275 initially to dispatch the mobile transfer vehcile 200 from the mobile vertical lift 100 once the locating means 160 (FIG. 11) are properly in place as indicated by the limit switch L-11. The circuitry shown in FIG. 23 operates to position the mobile transfer vehicle 200 in alignment with the desired bin by controlling the drive motor 275 in the following manner.

Initially, the stored count in counter 660 and the actual position count in reversible counter 665 can (for example, if the mobile transfer vehicle 200 is to travel to the middle or beyond the middle of the storage rack), be relatively high. As the transfer vehicle 200 travels away from the lift 100 it will, depending upon the distance it must travel, move at high, intermediate or slow speeds. As the vehicle approaches the desired bin, the count between circuits 660 and 665 approaches coincidence. This effect is utilized to slow the speed of the transfer vehicle 200 prior to reaching the desired bin 21 to prevent overshoot in the following manner.

The digital comparator 670 will detect coincidence between the preset count in storage counter 660 and the actual count in reversible counter 665. Upon detecting one greater than coincidence of the two counts, comparator 670 develops a control signal which is applied to the logic circuit 672 which responds to generate a second slow-down signal applied to the motor control circuit 674 via conductor 673. Thus, when the mobile transfer vehicle is one bin away from its desired destination, the drive motor 275 will be slowed to a creep speed. As the vehicle approaches the desired bin, the digital comparator 670 will detect coincidence between the counts in the storage counter 660 and the reversible counter 665 and produce an enabling signal which is applied to the logic circuit 672. When the logic circuit receives this signal, it applies a stop signal to the motor control circuit 674 which then removes power from the drive motor 275 and the vehicle comes to a stop in approximate alignment with the storage bin.

At this time, the transfer vehicle is at rest and the position matching check is automatically conducted. The top pair of photodetector sensors on panel 265 on the vehicle check stop bars 42 and 43 on label 11 to see if exact positioning has been achieved. If not, the logic circuit 672, which is coupled to these sensors via conductor 669, generates a signal which is applied to the motor control circuit to actuate drive motor 275 at a creep speed in a direction to correct for any slight misalignment. As exact alignment is achieved and the same luminance level is detected by the top pair of sensors in panel 265, the drive motor is stopped.

In the event a simple counting scheme is employed without the use of a coded label for providing centering bars as well as a redundant bin identification check, locators 290 can be employed to provide accurate final alignment of the vehicle with respect to the storage bin. In such an embodiment, the motor control circuit provides an enabling signal along conductor 671 to the locator control circuit 678 which actuates the locator 290 (FIGS. 16 and 19) to extend the forked member 295 outwardly to span one of the vertical support members 20 adjacent the desired bin as seen in FIG. 16. The vehicle 200 may thereby be moved slightly to accurately position the transfer vehicle in relation to the bin opening.

It is noted that the logic circuit 672 can be designed such that the speed of the drive motor 275 is continuously varied and decreased as the transfer vehicle approaches the desired bin as indicated by the decreasing differences between the counts in the storage and position counters and the reversible counters as detected by the digital comparators.

Once the mobile transfer vehicle is aligned with the desired storage bin, its position is checked by comparator 670' which compares the position signal stored in register 660' with the signal detected by the photodetectors which scan the code areas 44 of label 11. If coincidence is detected, the storage cycle can be continued. If however, the transfer vehicle has, for some reason, stopped at the wrong bin, the logic circuit will detect a non-coincidence signal from comparator 670' and can either generate a corrective drive signal by resetting the count in storage counter 660 (via conductor 675) to correspond to either the location of the bin as indicated by the coded address stored in register 660' or send the transfer vehicle to the end of the aisle to await a mobile vertical lift and later reprogramming.

Once the vehicle is positioned at the correct bin, the storage cycle is continued by transferring the load on the vehicle into the storage bin. It is necessary to raise the forks 240 (FIGS. 14 and 16 through 18) if not in a raised position, extend them to position the load within the storage bin, lower the forks, and once again retract the forks to the transfer vehicle. This sequence is initiated by the logic circuit which applies a signal to the fork control circuit 680 (via conductor 679) once comparator 670' verifies the positioning of the vehicle. In systems using the locators 290, the sequence is initiated by the limit switch L-17 which is physically coupled adjacent the locator 290 such that once the locator 290 is fully extended thereby insuring the alignment of the mobile transfer vehicle, the switch L-17 is actuated to provide an electrical control signal which is applied to the fork control circuit 680 (FIG. 23).

The fork control circuit also receives data from the information transfer panel 650 indicating whether it is to move the forks to the left or to the right side of the aisle and whether it is a store or retrieve mode of operation. This information tells the fork control circuit in which direction to extend and retract the forks as well as whether to raise or lower the forks after they have been extended as is required in the retrieve mode of operation discussed briefly below. It is noted that the bins 21 are designed such that they will receive only one palletized load, several bins being employed for common items in the warehouse or alternately the bins are inclined with rollers such that the palletized load thereon will always be toward the front of the bin and the mobile transfer vehicle can push the palletized load therein. In the preferred embodiment, the bins were designed such that only one bin was used for each palletized load, and the mini-computer in the computer control circuit 530 has information as to which bins are empty and, therefore, available for storage as well as which bins have certain types of material therein desired to be retrieved.

As noted earlier, since the two forks can be independently operated, a storage bin could contain two half-sized pallets and one or both could be stored or retrieved. For purposes of explaining the fork operation, it will be assumed that the fork control circuit 680 actuates both forks 240, it being understood that two such circuits could be provided to independently control each fork. The various limit switches discussed pertain to one of the forks, it being understood that for independent operation both forks have similar switches physically coupled thereto. It is noted here that to preserve the battery power for the transfer vehicles, it is preferred to carry the loads on the vehicle in a raised position once the forks have been raised to lift a pallet from a bin or the input station. In storage operation, circuit 680 first actuates the extension motors 212 (FIGS. 16 and 19) to cause the extension mechanism to extend the forks as described above in conjunction with FIGS. 16, 17 and 18. The palletized load 210 carried thereon then will be positioned in the storage bin slightly above the horizontal support members 22 (FIGS. 3 and 15).

Once the forks are fully extended, for example, to the left in FIGS. 3 and 19, a limit switch L-19 which is physically attached to the extension mechanism is actuated and provides an electrical signal to the fork control circuit 680 which deactuates the extension motors 212 and simultaneously actuates the raising motors 242 such that the motors will be driven in a direction to lower the platforms 245 and forks 240 thereon. When the load supported on the forks 240 is lowered into the storage bin, a limit switch L-20, which is mechanically coupled to the platforms 245, is actuated as the platforms reach the extreme lowered position. The actuation of L-20 initiates the reactuation of the extension motor 212 in the reverse direction to retract the forks 240 once the load rests on the storage bin support members 22 and simultaneously causes the circuit 680 to deactuate the raising motor 242. A limit switch L-22 is also coupled to the extension mechanism and is actuated thereby once the forks are in their centered position on the transfer vehicle and provides an electrical signal to the fork control circuit 680 which deactivates the extension motor 212. It is noted that the forks also have a right side limit switch L-21 which indicates to the fork control circuit 680 that the forks have been extended fully to the right when a load is to be stored or retrieved in a bin located to the right of the mobile transfer vehicle. By employing a plurality of limit switches which are mechanically coupled to the forks and lifting platforms and electrically coupled to circuit 680, extension and raising motors can be controlled to raise, extend, lower and retract the forks in the store mode of operation or extend, raise, retract and lower the forks in the retrieve mode of operation depending upon the information received from the panel 650. The circuit is normally employed to extend both forks simultaneously. In some cases, clutch 211' (FIGS. 16 and 17) is actuated such that only one fork is used. Also, each fork can have its own control circuit and be independently operated.

In the event that an error has been made by the minicomputer or by the operator at the control station 330 and a pallet is presently in a bin in which it is desired to store another pallet or alternately during the retrieve mode of operation, the bin is empty; sensor S-6 (FIG. 19) physically mounted to the forks indicate the lack of weight on the forks or pressure tending to resist the movement of the fork into the storage bin. These sensors provide a signal to the information transfer panel section 656 (FIG. 22) via panel 650 to convey this information to the computer via the mobile vertical lift 100 and festoon cable 325. The sensors are indicated generally as S-6 by the block diagram in FIG. 23 and are coupled to the information transfer panel 650 as shown. The vehicle 200 responds to signals from S-6 to return to the mobile vertical lift 100 in the event of an inventory error. Thus, the mobile transfer vehicle can provide diagnostic information to the computer to correct for any possible errors in the inventory as well as receive new information therefrom if one of the storage bins is empty or previously loaded such that the transfer vehicle can carry the load to another storage bin or alternately travel to another storage bin to receive a load.

Once the load has been discharged into a storage bin and the limit switch 22 has indicated that the forks are again centered on the mobile transfer vehicle, the motor control circuit 674 which also receives a signal from the limit switch L-22, is again actuated to propell the mobile transfer vehicle 200 back to the end of the aisle for movement onto the mobile vertical lift. The drive motor 275 is reversed and the storage counters 660 are reset to a predetermined number corresponding to the end of the aisle by means of a reset pulse developed from the limit switch L-22 and applied to the counter 660 via conductor 682. It is noted that the discussion here is limited to a simple store or retrieve function by the transfer vehicle, it is understood that the transfer vehicle could be programmed to first store a palletized load in a predetermined storage bin and once the forks are retracted onto the transfer vehicle travel to a second storage bin to retrieve a load before it again returns to the end of the aisle and is picked up by the mobile vertical lift.

As the mobile transfer vehicle 200 travels toward the end of the aisle adjacent the mobile vertical lift aisle 120, the the coincidence detected by comparator 670 causes the logic circuit 672 to reduce the speed of the drive motor 275 to a creep speed as the transfer vehicle approaches the aisle end. If the mobile vertical lift has during the time the mobile transfer vehicle was in the aisle performing its load transferring functions, been called to pick up another transfer vehicle or otherwise been dispatched from the aisle at which the transfer vehicle was discharged; the mobile transfer vehicle will automatically come to a stop at the end of the aisle by virtue of the coincidence detected by comparator 670 as the count in the storage counter 660 and the reversible counter 665 coincide. The logic circuit 672 will then trigger the motor control circuit 674 to stop motor 275 and the transfer vehicle 200. In the event the mobile vertical lift 100 is not in position to receive the transfer vehicle 200, the vehicle will remain at the aisle end until a mobile lift arrives and couples to the guide rails 18 of the aisle thereby triggering a sensor S-8 as described below to cause the vehicle 200 to move onto the lift.

A sensor S-7 is mounted at each aisle end (FIG. 11) and detects the presence of an awaiting mobile transfer vehicle 200. Each sensor S-7 is electrically coupled to the computer control circuit 530 as indicated in FIG. 20 and uniquely identifies the aisle. Thus, the circuit can dispatch the mobile vertical lift 100 to pick up an awaiting transfer vehicle 200. If more than one vehicle is awaiting pickup, they will be sequentially received by the lift 100.

In the event, however, that the mobile vertical lift is still positioned at the aisle and the tracks are in position, a sensor S-8 (FIG. 19), which is an optical detecting means mounted to the transfer vehicle, detects the aligned presence of the mobile vertical lift 100 to guide rails 18 of the aisle as indicated by a suitable light source positioned on the mobile vertical lift and actuated when the aligning means 160 have locked the rails together. S-8 is electrically coupled to the logic circuit 672 and delays the normal stop signal for a distance corresponding to two more detected counts by the detector 265. Thus, the mobile transfer vehicle will continue onward onto the mobile vertical lift which has a label 11 on the vertical members 104 (FIG. 5) at each aisle level such that the sensor 265 can be used to align the vehicle on the lift in the same manner as it aligns with a storage bin.

Once the mobile transfer vehicle is positioned on the mobile vertical lift, sensor L-1 indicates this condition to the mobile vertical lift control circuit 610. The circuit 610 then applies a signal via conductor 611 to the align control circuit 635 which activates actuator 195 causing the members 180 of the aligning means 160 (FIG. 11) to again swing outwardly. The signal from L-1 also causes the hoist motor control circuit to raise platform 150 slightly which facilitates the operation of the aligning means 160. A limit switch L-23 which is physically positioned to be contacted by the member 180 (FIG. 11) provides an electrical control signal to the mobile vertical lift control circuit 610 indicating that the lift 100 is decoupled from the storage racks and ready to be moved. Circuit 610 then actuates the hoist and drive motors 167 and 130 in a manner similar to that discussed above to return the mobile vertical lift to the home position as well as lowering the lift platform 150 to the home position such that the mobile transfer vehicle can be discharged to the input or output sides of the home station 300 (FIG. 13). When the lift 100 receives control signals sending it to the home station, the bridge control circuit 502 (FIG. 200 simultaneously receives a signal from the computer control circuit 530 to actuate the bridge mechanism retracting the bridge out of the way of lift 100.

Alternatively, the mobile vertical lift can be programmed to discharge the mobile transfer vehicle onto the guide rails 395 at the rear of the storage bins 10 (FIG. 1) such that the transfer vehicle can be dispatched to a different facility.

The circuitry described in FIGS. 20 through 23 is also employed in the retrieve mode of operation in which a mobile transfer vehicle 200 can be picked up at the home station 300 (FIG. 3) from the magazine storage facility 350 such that the empty transfer vehicle is carried to a predetermined aisle and aisle level by the mobile vertical lift 100 and discharged to travel down the aisle to a preassigned bin location, pick up a stored pallet therein and return to the home station to discharge the transfer vehicle at the output station 340. It is noted that the operation of the load transferring forks at the input and output stations 320 and 240 respectively, is controlled by the associated information transfer panels 370 (FIG. 1) located at these stations. The panels 370 interact with the panel 650 on the transfer vehicle (FIG. 22) and are electrically coupled to the computer control circuit 530 (FIG. 20) to receive control information therefrom. In this manner, the palletized loads are transferred to and from the input and output conveyors 322 and 345 respectively by means of the transfer vehicle itself.

The stub conveyor 385 may include an information transfer panel (not shown) which interfaces with panel 650 on the transfer vehicle 200 to cause the vehicle to transfer a load thereto which will be carried by that conveyor to another facility. It is noted that the input and output stations 320 and 340 as well as the tracks 375 have column labels at regular intervals such that the transfer vehicles can be programmed to automatically travel across the bridge 400 to any of these positions in the same manner as it travels along an aisle to a storage bin in the storage racks.

The magazine storage rack 350 may include means thereon for charging the battery pack 222 of the transfer vehicles 200 while they are in storage awaiting use. Likewise, the transfer vehicles 200 can be removed from the end of the storage magazine remote from aisle 120 for servicing and repairs. The transfer vehicles in the preferred embodiment were designed to travel at a nominal speed of 500 feet per minute. The system provided a through-put capacity of approximately 70 palletized loads per hour when a single mobile vertical lift and three mobile transfer vehicles were used with a single bank of storage racks on one side of the mobile vertical lift.

Figure 24:
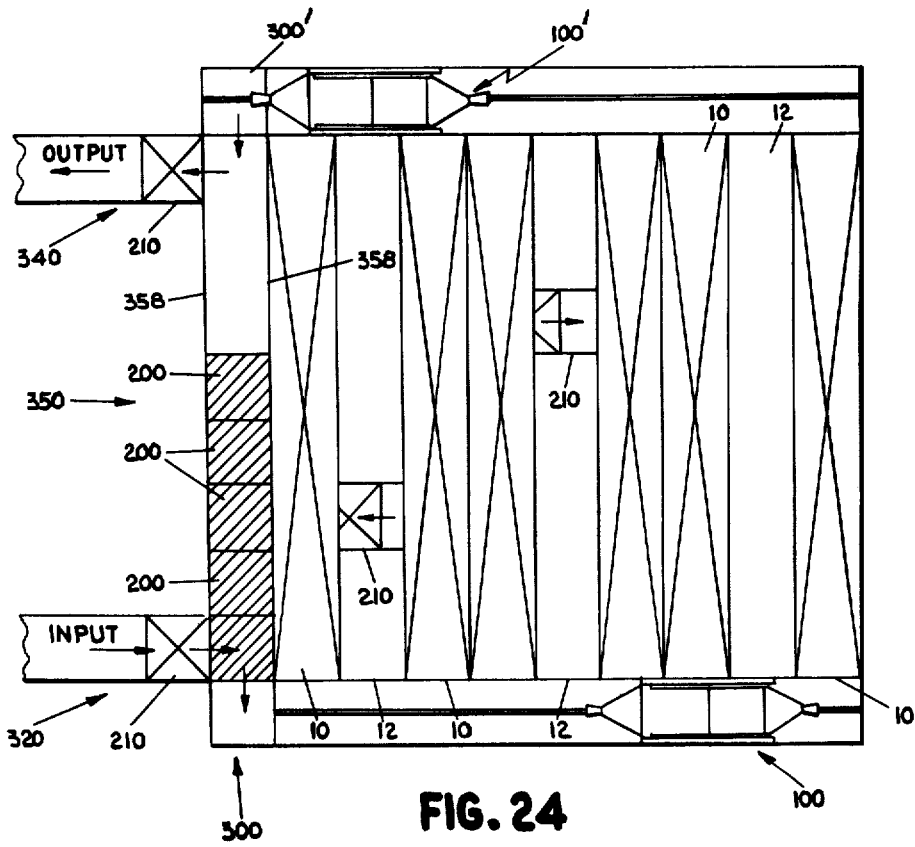
FIG. 24 is a plan view in schematic form of an alternative embodiment of the warehouse of the present invention.

Various modifications to this system as described herein can be made. For example, the mobile vertical lift can be employed at each aisle end of a plurality of milti-tiered storage racks 10 as shown in FIG. 24 where a mobile vertical lift 100 is exclusively operable with an input station 320, and a second mobile vertical lift 100' is exclusively operable with an output station 340 as shown. Each mobile vertical lift 100, 100' has a home station 300, 300' respectively, communicant with its respective input or output station via the end positions of the transfer vehicle storage area 350 located between the two stations 320, 340. The storage area includes guide rails 358 for carrying the transfer vehicles thereon. One of the aisles 12 can be used as a direct bypass between lifts 100, 100'; it being understood that each aisle 12 include guide and support means for the transfer vehicles. The control circuits discussed above can be employed with the circuitry for the additional lift 100'.

Figure 25:
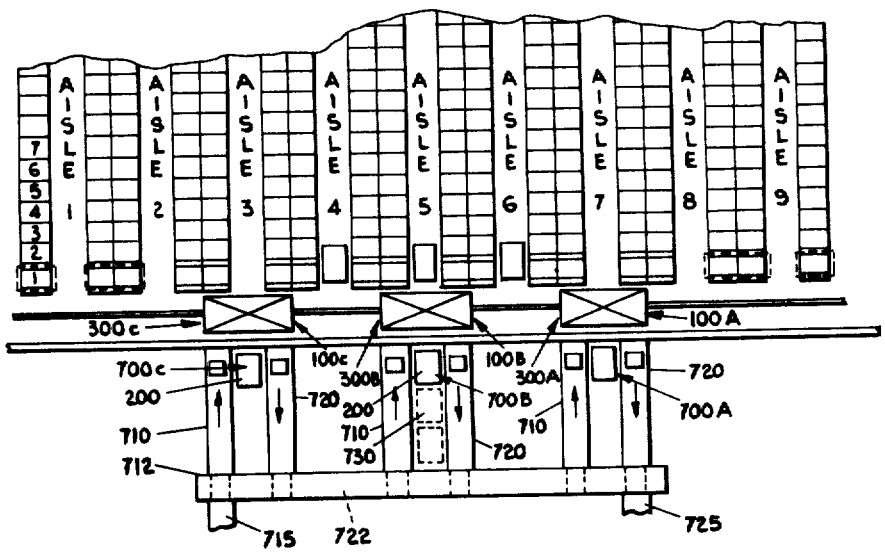
FIG. 25 is a plan view in schematic form of still another embodiment of the warehouse system of the present invention.

Referring now to FIG. 25, there is shown a nine aisle storage rack structure which is constructed in the same general manner as the storage racks shown in FIGS. 1 through 3. Across the end of the access aisles extends a transverse aisle 120 which carries three independently movable mobile vertical lifts 100A, 100B and 100C. Each mobile vertical lift 100 nominally services three adjacent access aisles although in certain conditions where increased activity is taking place at one end of the storage system, the mobile vertical lifts can be controlled to service greater or fewer access aisles as needed.

There is provided three input/output stations 700A, 700B and 700C to which the mobile vertical lifts transfer mobile transfer vehicles 200 when the vertical lifts are at the home stations 300A, 300B and 300C positioned along aisle 120 as shown in the figure. Each of the input/output stations 700A through 700C includes guide rails constructed similar to the rail arrangement shown in FIGS. 1 through 3 for the input/output stations described therein and each of the home stations 300A through 300C includes a retractable bridge similar to that also illustrated in FIG. 3. The input/output stations are positioned across the transverse aisles from the storage racks. Each of the input/output stations is positioned between an input conveyor 710 and an output conveyor 720 such that loads can be transferred between a mobile transfer vehicle at the station and the conveyors.

In addition to providing a station whereupon palletized loads can be transferred from the mobile transfer vehicles to an output conveyor or received by the mobile transfer vehicle from an input conveyor; each of the input/output stations 700A through 700C have guide rails which extend to a storage magazine area 730 such that mobile transfer vehicles not in use can be positioned in the storage magazine out of the way of the operational components of the system. In the figure, two vehicle storage locations are indicated in dashed lines for the magazine 730 associated with station 700B.

A central input conveyor 715 communicates with each of the input conveyors 710 by means of a sorting conveyor 712 which sorts labeled articles to the input conveyor associated with the input/output station which is serviced by the mobile vertical lift covering the storage area for that article. Thus, the sorting conveyor 712 includes conventional sorting means for discharging palletized articles from the conveyor onto the appropriate input conveyor 710. An accumulation conveyor 722 is communicant with each of the output conveyors 720 to gather articles from the conveyors and transport them to the main output conveyor 725 which interfaces the warehousing system with, for example, a shipping dock, manufacturing facilities or other locations.

The controls and sensors for the mobile transfer vehicles as well as the mobile vertical lifts are substantially the same as for the embodiment described in detail above. Thus, the mobile transfer vehicle is controlled by sensing a plurality of column labels located on the storage bins as well as the input/output station and storage magazine areas. The mobile vertical lifts are controlled by sensing aisle and aisle level identification means positioned at the ends of the aisles. Each of the mobile vertical lifts will include its own control circuits and a computer control will control the operation of the three mobile vertical lifts along the transverse aisle 120 such that they can each service three aisles independently or, as noted above, in the event that one or more aisles are heavily used, one or more mobile vertical lifts can be selectively controlled to service these aisles without interferring with each other.

With the system of FIG. 24, a relatively large storage rack facility with long access aisles can be even more efficiently operated by employing a pair of mobile vertical lifts with transfer vehicles 200 at opposite ends of the system. Another embodiment of the present invention is shown in FIG. 25 and is also useful to increase the through-put of the warehousing system when a single bank of storage racks with very long access aisles are employed.

Thus, it is seen that the mobile vertical lift together with the mobile transfer vehicle system can provide fully automatic or semi-automatic operation with an improved efficiency of material handling between input and output stations in a warehouse or between facilities such as storage and assembly facilities. Various modifications to this system will become apparent to those skilled in the art and will come within the scope of the invention as defined in the appended claims.

The embodiments of the invention in which an exclusive property or privilege is claimed are defined as follows:

1. A materials handling system comprising: a multi-level storage rack having a plurality of storage bins arranged in arrays on each level along a plurality of access aisles, pairs of horizontally spaced rails extending along and coupled to facing ends of storage bins on opposite sides of each aisle at each storage bin level, said rails extending adjacent the storage bins, a mobile vertical lift movable across the ends of the access aisles and alignable with a desired aisle, said mobile vertical lift including a lifting platform movable in a vertical direction to reach any desired storage bin level; a plurality of self-powered mobile transfer vehicles each including drive and support wheels and independently movable along an access aisle at a selected single storage bin level, each of said mobile transfer vehicles including means thereon for transferring articles between said mobile transfer vehicle and a storage bin at the same level as said mobile transfer vehicle, said mobile vertical lift being adapted to transport said mobile transfer vehicle thereon to a desired aisle and storage bin level and dispatch said mobile transfer vehicle therefrom, wherein each of said rails of said pairs of rails includes end stops pivotally mounted to obstruct the movement of said mobile transfer vehicle beyond said end stops when said end stops are in a first position, and wherein said mobile vertical lift includes camming means engaging said end stops of a selected aisle and aisle level for moving said end stops to a second position permitting a mobile transfer vehicle to be transferred between said mobile vertical lift and guide rails of a selected aisle and aisle level; and wherein said lifting platform of said mobile vertical lift includes a pair of horizontally spaced guide rails for supporting said mobile transfer vehicle thereon and wherein said camming means includes bridge means for coupling said guide rails on said lifting platform to said guide rails of said selected aisle and aisle level.

2. A materials handling system comprising: a multi-level storage rack having a plurality of storage bins arranged in arrays on each level along a plurality of access aisles and on opposite sides of a respective access aisle, vertically spaced rails extending along and coupled to facing ends of storage bins on opposite sides of each aisle and at each storage bin level laterally adjacent said access aisles, said rails extending adjacent the storage bins, a mobile vertical lift movable horizontally across the ends of the access aisles and alignable with a desired aisle, said mobile vertical lift including a lifting platform movable in a vertical direction to reach any desired storage bin level; a plurality of self-powered mobile transfer vehicles each independently movable along an access aisle at a selected single storage bin level on said rails associated with said selected single bin level, wherein said mobile transfer vehicle includes drive and support wheels supported by said rails when said mobile transfer vehicle is within an aisle, each of said mobile transfer vehicles including selectively programmable control means and means thereon for transferring articles between said mobile transfer vehicle and a storage bin at the same level as said mobile transfer vehicle, said mobile vertical lift being adapted to transport said mobile transfer vehicle thereon to a desired aisle and storage bin level and dispatch said mobile transfer vehicle therefrom, means on said mobile vertical lift to selectively program said control means on said transfer vehicles, wherein said mobile vertical lift includes means for supporting said mobile transfer vehicle thereon, alignment means mounted on said rails adjacent the ends thereof; said mobile vertical lift including bridge means thereon movable about a vertical axis and operative to engage said means to urge said mobile vertical lift into alignment with said rails and for coupling said support means of said lifting platform to said rails of said selected aisle and aisle level to permit a mobile transfer vehicle to be transferred between said mobile vertical lift and the support means of a selected aisle and aisle level.

3. The system as defined in claim 2 wherein each of said rails of said pairs of rails includes end stops pivotally mounted to obstruct the movement of said mobile transfer vehicle beyond said end stops when said end stops are in a first position, and wherein said bridge means includes a portion engaging said end stops of a selected aisle and aisle level for moving said end stops to a second position permitting a mobile transfer vehicle to be transferred between said mobile vertical lift and guide rails of a selected aisle and aisle level.

4. The system as defined in claim 3 wherein said support means of said mobile vertical lift includes a pair of horizontally spaced guide rails for supporting said mobile transfer vehicle thereon.

5. The system as defined in claim 2 and further including an input station and an output station each associated with said system and a home station for said mobile vertical lift, said mobile vertical lift movable to align with said home station such that a mobile transfer vehicle can be discharged from said mobile vertical lift to said input or output stations.

6. The system as defined in claim 2 and further including computer means coupled to said control means of said mobile vertical lift for providing programming information thereto.

7. The system as defined in claim 2 wherein each of said control means of said mobile transfer vehicle and said mobile vertical lift include transmitting and receiving means which align for transferring information therebetween when said mobile transfer vehicle is positioned on said mobile vertical lift.

8. The system as defined in claim 7 wherein said transmitting and receiving means comprises an optical interface panel including an array of light transmitting means and an array of light detecting means.

9. The system as defined in claim 2 wherein said lifting platform includes a carriage assembly including guide rails thereon adapted to receive a mobile transfer vehicle, said carriage assembly being movable on said platform in relation to said guide rails to permit accurate alignment of said rails to guide rails within an aisle.

10. The warehousing system as defined in claim 9 wherein said bridge means on said mobile vertical lift comprises segments of guide rails pivotally coupled to ends of said guide rails on said carriage assembly and operable to move into aligned and locked engagement with said alignment means adjacent ends of said guide rails in said aisles.

11. The warehousing system as defined in claim 2 wherein each of said mobile transfer vehicles include locating means for accurately positioning said mobile transfer vehicle adjacent a predetermined storage location.

12. The warehousing system as defined in claim 11 wherein said locating means comprises a retractable and extensible fork having a pair of tines adapted to be selectively extended such that said tines span a vertical support member forming a boundary of a storage location thereby fixing the position of said mobile transfer vehicle therewith.

* * * * *